US011377167B2

(12) United States Patent
Le Rodallec et al.

(10) Patent No.: US 11,377,167 B2
(45) Date of Patent: Jul. 5, 2022

(54) HUMAN-POWERED VEHICLE SUITABLE FOR COMPACT STORAGE

(71) Applicant: BIROTA, Vanves (FR)

(72) Inventors: Arnaud Le Rodallec, Paris (FR); Eric Carreel, Meudon (FR); Pierre Sauvageot, Saint Cyr l'Ecole (FR); Thibault Retiere, Nantes (FR)

(73) Assignee: BIROTA, Vanves (FR)

( * ) Notice: Subject to any disclaimer, the term of this patent is extended or adjusted under 35 U.S.C. 154(b) by 0 days.

(21) Appl. No.: 16/649,976

(22) PCT Filed: Sep. 28, 2018

(86) PCT No.: PCT/FR2018/052385
§ 371 (c)(1),
(2) Date: Mar. 23, 2020

(87) PCT Pub. No.: WO2019/063948
PCT Pub. Date: Apr. 4, 2019

(65) Prior Publication Data
US 2020/0223507 A1    Jul. 16, 2020

(30) Foreign Application Priority Data

Sep. 29, 2017 (FR) .................................... 17 59127
Jan. 5, 2018 (FR) .................................... 18 50087
Feb. 13, 2018 (FR) .................................... 18 51195

(51) Int. Cl.
*B62K 3/02* (2006.01)
*B62J 6/01* (2020.01)
(Continued)

(52) U.S. Cl.
CPC ............... *B62K 3/02* (2013.01); *B60L 53/16* (2019.02); *B62J 6/01* (2020.02); *B62M 6/90* (2013.01);
(Continued)

(58) Field of Classification Search
CPC ..... B62K 3/02; B62K 2015/001; B60L 53/16; B60L 2200/12; B62J 6/01; B62M 6/90; H02J 7/0013; H02J 7/0042; Y02T 10/70
See application file for complete search history.

(56) References Cited

U.S. PATENT DOCUMENTS 6,177,879 B1 *   1/2001   Kokubu ................ G07B 15/00
                                                        340/5.4
8,914,951 B2    12/2014   Gaudillere et al.
(Continued)

FOREIGN PATENT DOCUMENTS

CN        201347152 Y       11/2009
CN        204056070 U       12/2014
(Continued)

*Primary Examiner* — Jacob D Knutson
*Assistant Examiner* — Abigail R Hymel
(74) *Attorney, Agent, or Firm* — Im IP Law; Chai Im; C. Andrew Im

(57) ABSTRACT

A structure of a human-powered vehicle including at least one coupling kit having a fastening zone and a complementary fastening zone. The fastening zone being configured to be coupled to the complementary fastening zone presented by a second similar vehicle or by a fixed terminal. A vehicle and/or terminal including at least one coupling kit of the structure. A method of recharging battery of such vehicle.

18 Claims, 11 Drawing Sheets

(51) Int. Cl.
*B62M 6/90* (2010.01)
*H02J 7/00* (2006.01)
*B60L 53/16* (2019.01)
*B62K 15/00* (2006.01)

(52) U.S. Cl.
CPC .......... *H02J 7/0013* (2013.01); *H02J 7/0042* (2013.01); *B60L 2200/12* (2013.01); *B62K 2015/001* (2013.01); *Y02T 10/70* (2013.01)

(56) References Cited

U.S. PATENT DOCUMENTS

| | | |
|---|---|---|
| 2008/0297108 A1 | 12/2008 | Le Gars |
| 2010/0089846 A1 | 4/2010 | Navarro Ruiz et al. |
| 2010/0228405 A1* | 9/2010 | Morgal ................... B60L 53/68 701/2 |
| 2010/0313614 A1 | 12/2010 | Rzepecki |
| 2011/0148346 A1* | 6/2011 | Gagosz ................... B60L 53/51 320/103 |
| 2015/0321569 A1* | 11/2015 | Muait Jardim ......... B60L 53/16 320/101 |
| 2016/0039496 A1* | 2/2016 | Hancock ................. G01S 19/19 701/60 |
| 2017/0116805 A1* | 4/2017 | Neupert .................. B60L 53/30 |

FOREIGN PATENT DOCUMENTS

| | | |
|---|---|---|
| CN | 204623699 U | 9/2015 |
| CN | 205131506 U | 4/2016 |
| EP | 2508095 B1 | 5/2015 |
| EP | 2913260 A1 | 9/2015 |
| EP | 2955092 A1 | 12/2015 |
| FR | 2883090 A1 | 9/2006 |
| JP | 2016067189 A | 4/2016 |
| KR | 20090066880 A | 6/2009 |
| KR | 100948573 B1 | 3/2010 |
| KR | 20110007466 A | 1/2011 |
| KR | 20110007553 A | 1/2011 |
| WO | 98/39200 A1 | 9/1998 |
| WO | 2012/107448 A1 | 8/2012 |
| WO | 2016/147599 A1 | 9/2016 |

* cited by examiner

HUMAN-POWERED VEHICLE SUITABLE FOR COMPACT STORAGE

RELATED APPLICATIONS

This application is a § 371 application of PCT/FR2018/052385 filed Sep. 28, 2018, which claims priority from French Patent Application No. 17 59127 filed Sep. 29, 2017, No. 18 50087 filed Jan. 5, 2018 and No. 18 51195 filed Feb. 13, 2018, each of which is incorporated herein by reference in its entirety.

TECHNICAL FIELD OF THE INVENTION

The field of the invention is that of transport means.

More specifically, the invention relates to a structure of a human-powered vehicle suitable for a compact storage.

The invention relates, in particular, to applications for compactly storing a bicycle fleet. In the scope of a shared bicycle service, this storage can in particular be achieved in one or more places of an urban environment.

STATE OF THE ART

Techniques for storing a bicycle fleet are known from the prior art, by installing in particular individual terminals for each bicycle of the fleet. Such terminals generally comprise a mechanical device locking the use of the bicycle and requiring to be controlled to release the bicycle which can thus be used. Furthermore, these terminals can be electrically supplied in order to be able to recharge a battery of a power assist, possibly comprised in the bicycle.

The main disadvantage of the installation of these individual terminals is to require the installation of a multitude of fixed terminals, which involves monopolizing a large surface for storing the fleet. It could be highlighted that in the scope of a shared system, the number of terminals is generally a lot greater than the number of bicycles deployed in order to make it possible for a user to have more of a chance of finding an available place at the arrival point thereof.

None of the current systems make it possible to simultaneously respond to all the needs required, namely, to propose a technique which makes it possible to densify the storage of a fleet of human-powered vehicles, while only requiring a minimum installation.

SUMMARY OF THE INVENTION

The present invention aims to overcome all or some of the disadvantages of the state of the art cited above.

To this end, the present invention aims, according to a first aspect, a structure of a human-powered vehicle.

A human-powered vehicle can be, for example, a bicycle, also called bike, a tricycle, a scooter, a pedal car, a pedal boat, etc. Generally, the human power is ensured by a pedaling device used by an individual, the pedaling device generally comprising two cranks driving a crankset's spindle in rotation.

The structure can be, in particular, a frame or a chassis.

According to the invention, the structure of the vehicle comprises at least one coupling kit comprising fastening means and complementary fastening means, the fastening means engaging with the complementary fastening means presented by a similar vehicle or by a fixed terminal.

In other words, the structure of the vehicle comprises at least one coupling kit comprising fastening means and complementary fastening means, the fastening means being capable of being coupled to complementary fastening means presented by a second similar vehicle or by a terminal. In other words, the fastening means are configured to be coupled to complementary fastening means presented by a second similar vehicle or by a terminal.

Thus, the space between two vehicles coupled together can be reduced to a minimum, even zero, which makes it possible to achieve a vehicle storage which is compact.

In particular embodiments of the invention, the fastening means and the complementary fastening means of one same coupling kit are positioned laterally in a plane perpendicular to a longitudinal axis of said vehicle, or to the axis of main movement of said vehicle.

Generally, the fastening means and the complementary fastening means of one same coupling kit are positioned on either side of the vehicle.

Thus, two coupled vehicles are aligned about an axis perpendicular to the longitudinal axis or to the axis of movement.

It could be highlighted that when the vehicle is a bicycle, the bicycle has a longitudinal median plane corresponding substantially to a plane of main symmetry of the bicycle. During the movement of the bicycle in a straight line, the longitudinal median plane is vertical and parallel to the wheels of the bicycle. The fastening means and the complementary fastening means are laterally moved with respect to the longitudinal median plane.

Furthermore, the fastening means and the complementary fastening means are also generally at the same level or at the same height, holding the bicycle vertically, in the natural position thereof.

In particular embodiments of the invention, the fastening means and the complementary fastening means of one same coupling kit are laterally positioned, on either side of said vehicle, and offset by a predetermined distance about the axis of main movement of said vehicle.

Thus, the vehicles coupled together are aligned in a predefined position, making it possible to decrease the bulk of parked vehicles.

In particular embodiments of the invention, the distance between the fastening means and the complementary fastening means of one same coupling kit is less than the size of said vehicle.

Thus, it is possible to have a very compact storage. In the case of a bicycle, the size corresponds to the distance between the ends of the handlebar.

In the case where the fastening means comprise a first surface capable of abutting a second surface presented by the complementary fastening means presented by a second similar vehicle or by the terminal, the distance between the fastening means and the complementary fastening means corresponds to the distance between the first surface and the second surface of one same coupling kit.

It could be highlighted that the first surface and the second surface of one same kit are parallel to one another and preferably parallel to a median plane of the vehicle, even to the longitudinal median plane in the case of a bicycle.

It could also be highlighted that the distance between the fastening means and the complementary fastening means of one same kit defines the path between each vehicle of a coupling comprising a plurality of coupled vehicles.

In the case of a bicycle, the distance between the fastening means and the complementary fastening means of one same coupling kit can be advantageously greater than the width of the crankset at the level of the two cranks, a pedal of a bicycle could possibly come into contact with a pedal of a second bicycle, once this contact only causes an effect of driving the second pedal by the first pedal, without blocking the rotation of the two cranksets.

Advantageously, the distance between the fastening means and the complementary fastening means of one same kit can be advantageously greater than the width of the crankset by considering the pedals, such that the pedals can freely rotate when two bicycles are coupled.

In particular embodiments of the invention, the structure of the vehicle comprises at least two coupling kits.

Thus, two vehicles can be more easily coupled parallel against one another.

In particular embodiments of the invention, the complementary fastening means comprise at least one magnet engaging with at least one magnet comprised by the fastening means.

The two magnets can advantageously be of opposite polarity.

In particular embodiments of the invention, the complementary fastening means comprise at least one permanent magnet engaging with at least one metal element presented by the fastening means.

The metal element can in particular be a metal sheet.

In particular embodiments of the invention, the complementary fastening means also comprise an electromagnet capable of creating a magnetic field opposite the magnetic field of the permanent magnet.

Thus, the decoupling of two bicycle can be facilitated.

Advantageously, the vehicle can comprise means for detecting the gripping by an individual.

Thus, when a gripping is detected, the electromagnet is controlled to create a counter-field.

In particular embodiments of the invention, the fastening means have a male element capable of being coupled with a female element presented by the complementary fastening means.

In other particular embodiments of the invention, the complementary fastening means have a male element capable of being coupled with a female element presented by the fastening means.

In particular embodiments of the invention, the female element comprises an oblong-shaped recess, wherein the length is oriented perpendicularly to the axis of main movement of said vehicle.

Thus, it is possible to couple two vehicles despite roughness of the ground on which the two vehicles rest, such as a slope.

In particular embodiments of the invention, the fastening means and the complementary fastening means each comprise complementary electrical connection means, capable of electrically connecting said vehicle with the second vehicle or with the terminal.

Thus, a charge circuit can be implemented, electrically connecting the bicycles coupled together.

It could be highlighted that the charge circuit can be achieved by way of a coupling kit, the coupling kit comprising at least two pairs of complementary electrical connectors.

Alternatively, the charge circuit can also be achieved by way of two coupling kits, each kit comprising at least one pair of complementary electrical connectors.

In particular embodiments of the invention, the vehicle also comprises means for identifying said vehicle and means for communicating the identification of said vehicle to a similar vehicle.

In particular embodiments of the invention, the means for communicating the identification of said vehicle comprise a tag according to the NFC (Near Field Communication) standard, the tag being comprised in the complementary fastening means, and wherein the fastening means comprise an NFC reader capable of reading the NFC tag of the second vehicle.

In particular embodiments of the invention, said structure is a frame of a bicycle.

The invention also aims for a structure, such as a bicycle frame, of the type comprising a frame structure comprising a pair of lateral faces mutually opposite and a first fastening element mounted in a first zone on the frame structure. The frame further comprises a second fastening element arranged in a second zone of the frame structure, the second fastening element being complementary to the first fastening element, the first zone is located on one of the lateral faces, while the second zone is located on the other of the lateral faces, and the first zone and the second zone are arranged substantially at one same level of the frame structure and offset from one another along a longitudinal direction of the frame.

In this manner, similar frames according to the invention can be attached to one another in a predefined position. The offset arrangement of the fastening elements on the frame makes it possible to decrease the bulk of parked bicycles.

In an embodiment, the first zone can be arranged on a saddle tube or a down tube of the frame structure, and the second zone can be arranged on a seat stay or a fork of a steering shaft of the frame structure. In this manner, the difference between different similar bicycles is optimized.

In an embodiment, at least one from among the first fastening element and the second fastening element protrudes from the respective lateral face. This facilitates the access to, respectively, the first fastening element and/or the second fastening element. The fastening of the first element on the second is facilitated.

In an embodiment, the frame structure comprises a steering shaft, which comprises a third fastening element, and a fourth complementary fastening element of the third fastening element, the third fastening element being arranged in a third zone on a front face of the steering shaft and the fourth fastening element being arranged in a fourth zone on a rear face of the steering shaft, the third and fourth zones being arranged substantially at one same level and offset from one another along a transversal direction with respect to the frame.

Similar bicycles according to the invention can thus be immovably fastened to one another in a predefined position. This further decreases the bulk of parked bicycles. The frames are furthermore held together, which avoids in particular the need for a stand to park the bikes in the standing position.

The frame can further comprise a fixing assembly which holds the first fastening element in the first zone, the second fastening element in the second zone, the third fastening element in the third zone and/or the fourth fastening element in the fourth zone. This facilitates the positioning of each fastening element on the frame structure.

In a particular embodiment, the steering shaft comprises a handlebar, and the third and fourth fastening elements are positioned on said handlebar. This makes it possible to immovably hold the handlebar in a predefined position.

In another particular embodiment, each fastening element comprises a magnet and each complementary fastening element comprises a part made of magnetic material. This facilitates the connection between two similar bicycles.

At least one from among the first, second, third and fourth fastening elements can comprise a device with electromagnet(s) which comprises a control means for locking and unlocking the fastening element(s) with the complementary fastening element(s). This offers more flexibility for a free-service access of the bicycles.

In another particular embodiment, the fixing assembly comprises a slide device so as to hold each fastening element while making it possible for a movement of each fastening element according to a degree of freedom in a perpendicular direction with respect to the ground. This makes it possible to overcome ground irregularities, for example a ground which is not perfectly flat or a sloping ground.

In another particular embodiment, the slide device comprises a rail and a slide mounted on said rail and each fastening element is mounted on said slide. This construction is effective for achieving a degree of freedom in a direction perpendicular with respect to the ground with fastening elements of potentially quite different form and/or nature.

In another particular embodiment, each fastening element is mounted on the slide by means of a pivot. This makes it possible to further overcome ground irregularities.

According to a second aspect, the invention also aims for a vehicle comprising a structure according to any one of the preceding embodiments.

In particular embodiments of the invention, the vehicle also comprises wireless communication means capable of communicating with a similar vehicle, a terminal or a remote server.

In particular embodiments of the invention, said vehicle is a bicycle.

According to a third aspect, the invention also relates to a terminal comprising complementary fastening means capable of receiving fastening means of a vehicle according to any one of the preceding embodiments.

In particular embodiments of the invention, the complementary fastening means of the terminal comprise electrical connection means configured to electrically power the fastening means of a vehicle coupled with the terminal.

Thus, one single terminal is enough to electrically power one or more vehicles coupled with the terminal.

To this end, the terminal can be electrically connected to a battery, an electrical generator or an electrical network. The battery or the electrical generator, making it possible to make the terminal autonomous, can be advantageously integrated with the terminal.

According to a fourth aspect, the invention relates to a method for recharging a battery of all or some of a plurality of vehicles according to any one of the preceding embodiments, said vehicles each comprising an electronic module and an electrical battery powering a pedal-assist device of said vehicle, said vehicles being coupled with one another, the set of coupled vehicles being called stock, the stock being coupled with a terminal according to the preceding embodiment, the terminal being connected to an electrical supply.

Such a method comprises steps of:
determining an electronic module, called master module, from among the electronic modules comprised in the vehicles of the stock;
communicating to the master module, the list of vehicles of the stock and of the status of the battery thereof;
selecting at least one battery to be charged;
communicating by the master module, a command to the module of each vehicle of the stock in order to connect the battery(ies) selected to a charge circuit connected to the electrical supply, the other batteries of the stock being disconnected;
recharging of the battery(ies) selected.

In particular implementations of the invention, the selection of the battery(ies) to be charged is restricted to a predetermined number, said selection comprising the battery(ies) having a charge level less than a predetermined threshold, from among the batteries of the vehicles connected at a predetermined distance from the free end of the stock.

In particular implementations of the invention, the terminal comprises an electronic module and the master module is determined from among the electronic modules comprised in the vehicles of the stock or in the terminal.

BRIEF DESCRIPTION OF THE FIGURES

Other particular advantages, aims and features of the present invention will emerge from the following non-limiting description of at least one particular embodiment of the devices and method, which are the subject of the present invention, regarding the appended drawings, wherein.

DETAILED DESCRIPTION OF EMBODIMENTS OF THE INVENTION

The present description is given in a non-limiting manner, each feature of an embodiment which could be combined with any other feature of any other embodiment advantageously.

Now, it is noted, that the figures are not to scale.

Example of a Particular Embodiment of the Invention

Figure 1:
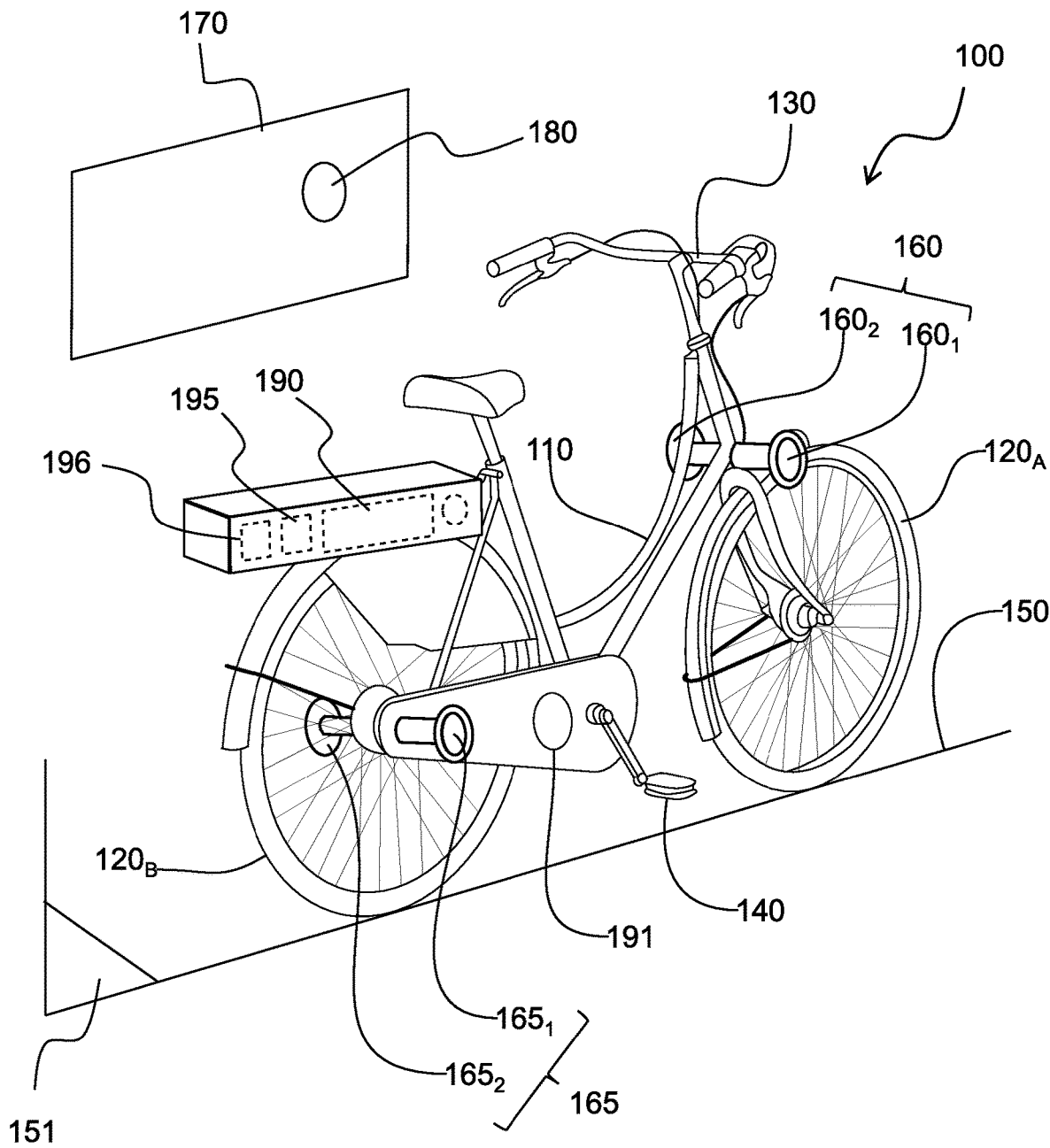
FIG. 1 represents a view of a vehicle comprising a structure according to the invention.

FIG. 1 represents a human-powered vehicle 100, commonly known under the name of bicycle. The vehicle 100 comprising in particular a tubular frame 110, two wheels 120, a handlebar 130 and a crankset 140, is called below in the description, bicycle 100. The structure of the vehicle 100 is consequently in the present example, non-limiting of the invention, the frame 110 of the bicycle 100.

It could be highlighted that the bicycle 100 is moved about a longitudinal axis 150 when the wheels 120 are parallel.

The frame of the bicycle 100 is substantially symmetrical with respect to a median plane 151 parallel to the longitudinal axis 150, the median plane 151 generally comprising the two wheels 120 when they are parallel.

The bicycle 100 has, laterally on each side, moved by a distance defined with respect to the median plane 151, a front fastening zone 160 and a fastening zone 165 located behind the bicycle 100.

It could be highlighted that the fastening zone $160_1$, on a side of the bicycle 100, is advantageously complementary to the fastening zone $160_2$, on the other side of the bicycle 100.

In other words, the bicycle 100 comprises two coupling kits, one at the front of the bicycle 100 and the other at the rear of the bicycle 100, the front coupling kit comprising a fastening zone $160_1$ and a complementary fastening zone $160_2$, the rear coupling kit comprising a fastening zone $165_1$ and a complementary fastening zone $165_2$.

In variants of this particular embodiment of the invention, the bicycle 100 comprises only one single coupling kit, preferably in the proximity of the front of the bicycle 100, comprising a fastening zone and a complementary fastening zone.

In the present non-limiting example of the invention, the two front fastening zones 160 are substantially just under the axis of rotation of the front wheel $120_A$, while the two rear fastening zones 165 are substantially in the axis of rotation of the rear wheel 120B.

The zones 160, 165 make it possible to hold the bicycle 100 to a device 170 having at least one complementary fastening zone 180 to one of the zones 160 or 165. The holding of the bicycle 100 to the device 170 is generally achieved by using a magnetic attraction force by the presence of a permanent (or not) magnet. An electromagnet can be provided to create a magnetic counterforce in order to detach the bicycle 100 more easily.

In order to trigger the electromagnet, a device indicating the gripping of the bicycle 100 by a user can advantageously be comprised in the bicycle 100. This device for detecting the gripping can be, for example, placed at the level of the handlebar 130 of the bicycle 100 in order to detect, by way of an accelerometer, a movement of the handlebar 130.

The device 170 can, in particular, be a fixed terminal or another bicycle which is similar, even identical, to the bicycle 100.

Indeed, the fastening zones 160 and 165 present on one side, for example on the left side of the bicycle 100, have a form and/or a polarity complementary to the fastening zones 160 and 165 facing one another, on the other side, for example on the right side of the bicycle 100.

It could be highlighted that two fastening zones 160 and the two fastening zones 165 are positioned laterally in a plane perpendicular to the longitudinal axis 150, in order to make it possible for a storage of the bicycles 100 in a line perpendicular to the axis 150. The fastening zones 160 and 165 generally have a flat face parallel to the longitudinal axis 150, each flat face being capable of coming into contact with a flat face presented by the fastening zone 180.

Advantageously, the distance between the fastening zone $160_1$ and the complementary fastening zone $160_2$ is less than the size of the bicycle 100, the size corresponding here to the distance between the ends of the handlebar 130, but greater than the width of the crankset 140.

It could be highlighted that the distance between the fastening zones 165 at the rear of the bicycle 100 is substantially equal to the distance between the fastening zones 160 located at the front of the bicycle 100. Thus, two bicycles 100 coupled together are parallel.

The bicycle 100 also comprises a battery 190 connected to an electrical pedal-assist device 191, and an electronic module 195 comprising a microprocessor, a computerized memory and a wireless communication device 196. The wireless communication device 196 is based, for example, on a wi-fi protocol, on a Bluetooth Low Energy® (BLE) protocol, or on any other protocol well-known to a person skilled in the art. The electronic module 195 can also be called microcontroller.

Figure 2:
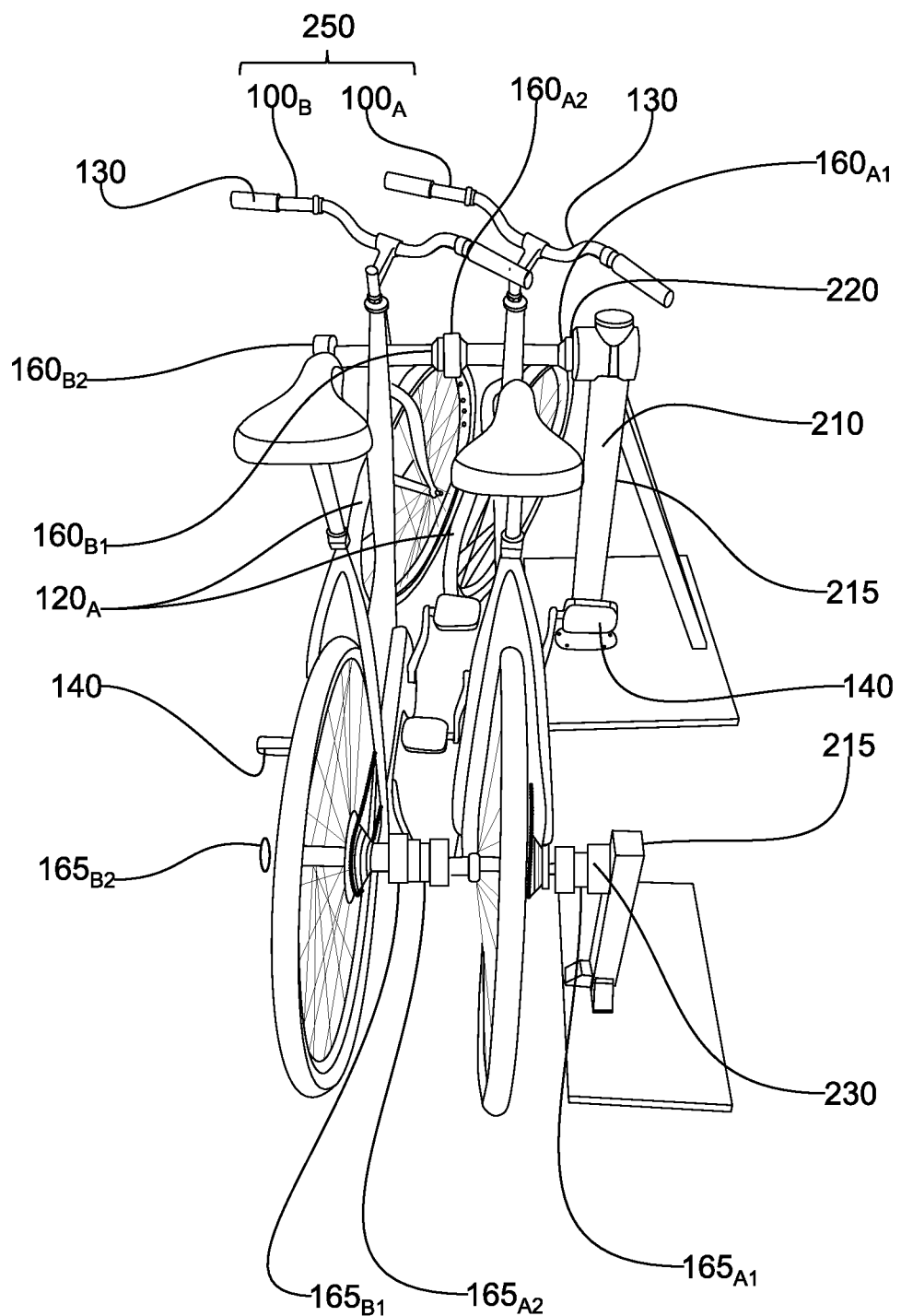
FIG. 2 is a view of the vehicle storage of FIG. 1.

FIG. 2 illustrates the storage of two bicycles 100 at a terminal 210 comprising two masts 215.

The terminal 210 has a zone 220 on which is held by magnetization to the zone $160_{A1}$ on the right side of the first bicycle $100_A$ and a zone 230 on which is held by magnetization to the zone $165_{A1}$ on the right side of the first bicycle $100_A$.

In variants of this particular embodiment of the invention, the terminal 210 also comprises an electronic module comprising a microprocessor, a computerized memory and a wireless communication device. The electronic module of the terminal is generally similar to the electronic module 195 of the bicycle 100.

The second bicycle $100_B$ is then positioned on the first bicycle $100_A$. To hold the second bicycle $100_B$ to the first bicycle $100_A$, the fastening zone $160_{B1}$ on the right side of the second bicycle $100_B$ is held by magnetization to the zone $160_{A2}$ on the left side of the first bicycle $100_A$. To guarantee the parallelism of the two bicycles 100, the fastening zone $165_{B1}$ on the right side of the second bicycle $100_B$ is held by magnetization to the zone $165_{A2}$ on the left side of the first bicycle $100_A$.

Each of the two coupling kits can comprise, to this end, an electromagnetic suction cup on one side and a metal plate on the complementary side. A mechanical ball joint offering degrees of freedom in rotation can also be provided, for example, on the side of the metal plate, as well as a spring in order to ensure the contact between the metal structures, whatever the roughness of the ground.

The fastening zones $160_{B2}$ and $165_{B2}$ to the left of the bicycle 100 are free for the fastening of another bicycle.

It is thus possible to create a stock 250 of bicycles 100 which is arranged compactly and densely. By this system, it is thus possible to store a plurality of bicycles 100 by spacing the bicycles 100 with a step of around twenty-five centimeters. The spacing step is generally configured to make it possible to place two bicycles 100 side-by-side by leaving sufficient space such that the crankset 140 can rotate freely.

It could be highlighted that the handlebars 130, and consequently the front wheels $120_A$, are advantageously rotated in order to not collide with one another, thus contributing to the compactness of the storage.

It could also be highlighted that the fastening zones 160, 165 are generally laterally off-center with respect to the frame 110 and that the distance between each lateral end of the fastening zones 160 or fastening zones 165 is configured according to the spacing step between each bicycle 100.

The rear fastening zones 165 generally offer more degrees of freedom than the front fastening zones 160 in order to make it possible to compensate for the roughness or a possible inclination of the ground on which the bicycles 100 rest.

Each rear fastening zone 165 can, for example, have a plane coming into contact with a plane of another fastening zone 165, the coupling of the two planes not being constrained along a lateral direction, in particular along a substantially vertical direction.

A user wanting to use a bicycle 100 of the stock 250, takes the first bicycle 100$_A$ available, namely that which is opposite the terminal 210.

In variants of this particular embodiment of the invention, the terminal 210 has front 160 and rear 165 fastening zones on each side of the masts 215 in order to be able to store bicycles 100 on either side of the terminal 210 and to make it possible to easily remove two bicycles 100.

Figure 3A:
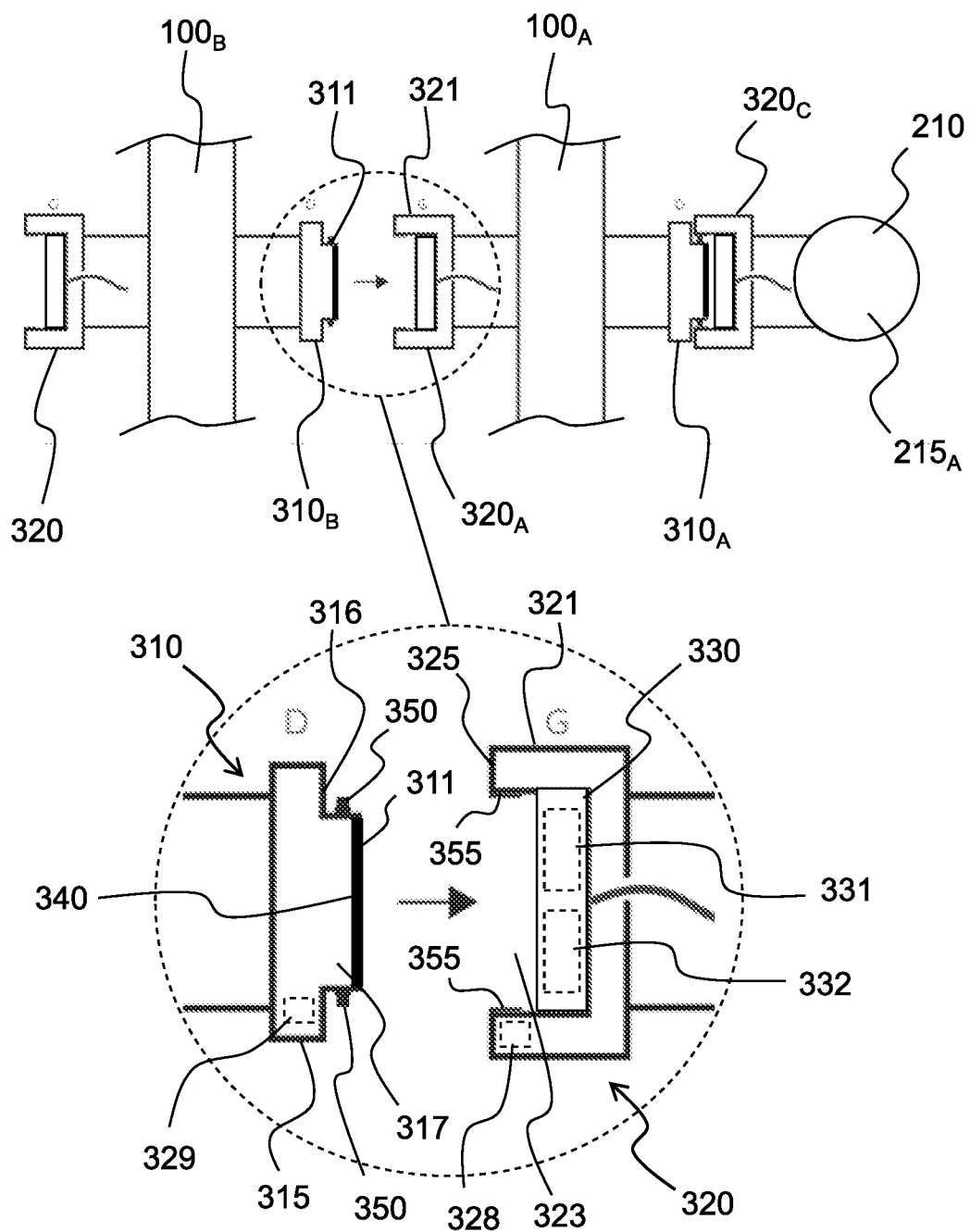
FIG. 3A is a schematic, cross-sectional view of the vehicle storage of FIG. 2, illustrating the coupling means between two vehicles.

FIG. 3A is a schematic view representing in detail, a coupling mechanism example between two front fastening zones 160, namely between a fastening zone 310 and a complementary fastening zone 320.

FIG. 3A thus has a terminal 210 and two identical bicycles 100. The bicycle 100$_A$ is coupled to the terminal 210 by way of a front fastening zone 310$_A$, located in the present non-limiting example of the invention to the right of the bicycle 100$_A$, and of a complementary fastening zone 320$_C$ fixed to the mast 215$_A$ of the terminal 210.

The bicycle 100$_A$ also comprises a complementary fastening zone 320$_A$, located on the left side thereof, and intended to be coupled with a fastening zone 310$_B$ of the bicycle 100$_B$.

It could be highlighted that a device of any nature can be coupled with the stock 250 insofar as it has at least one fastening zone 310 or at least one complementary fastening zone 320.

The fastening zone 310 has a male element 311 engaging with a female element 321 of a front fastening zone 320.

The male element 311 of the fastening zone 310 is configured in the present non-limiting example of the invention by a cylindrical part 315 comprising a shoulder 316 surrounding a cylindrical boss 317. The shoulder 316 is intended to abut on the female element 321 which comprises an oblong-shaped recess configuring a housing 323 wherein is inserted the cylindrical boss 317 presented by the male element 311.

It could be highlighted that the shape of the recess is advantageously oblong in the vertical direction in order to overcome irregularities of the ground on which the bicycles 100$_A$, 100$_B$ and the terminal 210 rest, by offering a vertical degree of freedom, the width of the oblong shape being substantially greater than the diameter of the boss 317.

Thus, the male element 311 can be fixed at different heights, with a vertical freedom of around ten millimeters with respect to the center of the housing 323.

Each bicycle 100 comprises an identification inscribed in an NFC (Near Field Communication) tag 328 comprised in the female element 321, as well as an NFC reader 329 comprised in the male element 311 capable of reading the NFC tag 328 of a bicycle 100 in the vicinity.

In order to keep the two fastening zones 310 and 320 in contact, an electromagnetic suction cup 330 fixed to the bottom of the housing 323 engages with a steel plate 340 fixed to the flat end of the boss 317.

Thus, when the boss 317 is inserted in the housing 323, the fastening zone 310 is attracted by the magnetic force exerted by the electromagnetic suction cup 330 on the plate 340.

The electromagnetic suction cup 330 comprises a permanent magnet 331 and a coil 332 which, when it is supplied, creates a magnetic counter-field reducing or neutralizing the magnetic field of the magnet 331, in order to make it possible to decouple two fastening zones 310 and 320 more easily.

It could be highlighted that the electromagnetic suction cup 330 is advantageously removed in the female element 321, instead of being placed on the male element 311, thus reducing the risk of unintentional magnetization of metal elements located in the proximity of the suction cup 330.

In variants of this particular embodiment of the invention, the magnetic suction cup comprises a permanent magnet and a mechanism for moving the magnet between a close position and a remote position from the outer surface 325, the remote position conferring a magnetization force more reduced than in the close position.

When the fastening zones 310 and 320 are in contact, the electromagnetic suction cup 330 can be flattened against the plate 340. At least one of the fastening zones 310 and 320 can comprise a ball joint (not represented in the figure) making it possible to offer additional degrees of freedom in rotation. The plate 340 can, for example, be mounted on this ball joint.

Furthermore, the plate 340 can also be mounted on a spring (not represented in the figure) making it possible to contribute to the contact between the plate 340 and the electromagnetic suction cup 330.

When the fastening zones 310 and 320 are in contact, the shoulder 316 is abutted on the outer surface 325, and an electrical connection is established between the two fastening zones 310 and 320 by way of two connectors 350 radially protruding on the perimeter of the boss 317.

To establish the electrical connection, the two connectors 350, horizontally diametrically opposed, are in contact with two plates 355 presented by the flat vertical plates of the oblong-shaped housing 323. Thus, the electrical contact is ensured, whatever the coupling height between the fastening zones 310 and 320.

Advantageously, the connectors 350 comprise a spring in order to ensure the electrical contact between the connectors 350 and the plates 355. The spring makes it possible also to rectify a difference in distance which could appear if the axis formed by the two connectors 350 is inclined with respect to the tangent of the plates 355, which can be the case when the ground comprises roughness. The maximum admissible angle is generally of around 5 to 10°.

It could be highlighted that for each bicycle 350, each connector 350 is connected to a plate 355 in order to electrically connect all of the bicycles 100 of the stock 250 by producing an electrical circuit, called charge circuit, which is generally supplied by a continuous charge voltage.

When the bicycle 100 comprises two coupling kits, one at the front and one at the rear, it could be highlighted that the coupling kit having the most degree of freedom in the vertical plane, i.e. in the present non-limiting example of the invention, that located at the rear of the bicycle, can also contribute to the electrical connection between two coupled bicycles 100. The electrical contact at the rear can be achieved, for example thanks to the contact between the magnetic suction cup of the rear coupling kit of the first bicycle 100$_A$ and the metal plate of the rear coupling kit of the second bicycle 100$_B$.

Figure 3B:
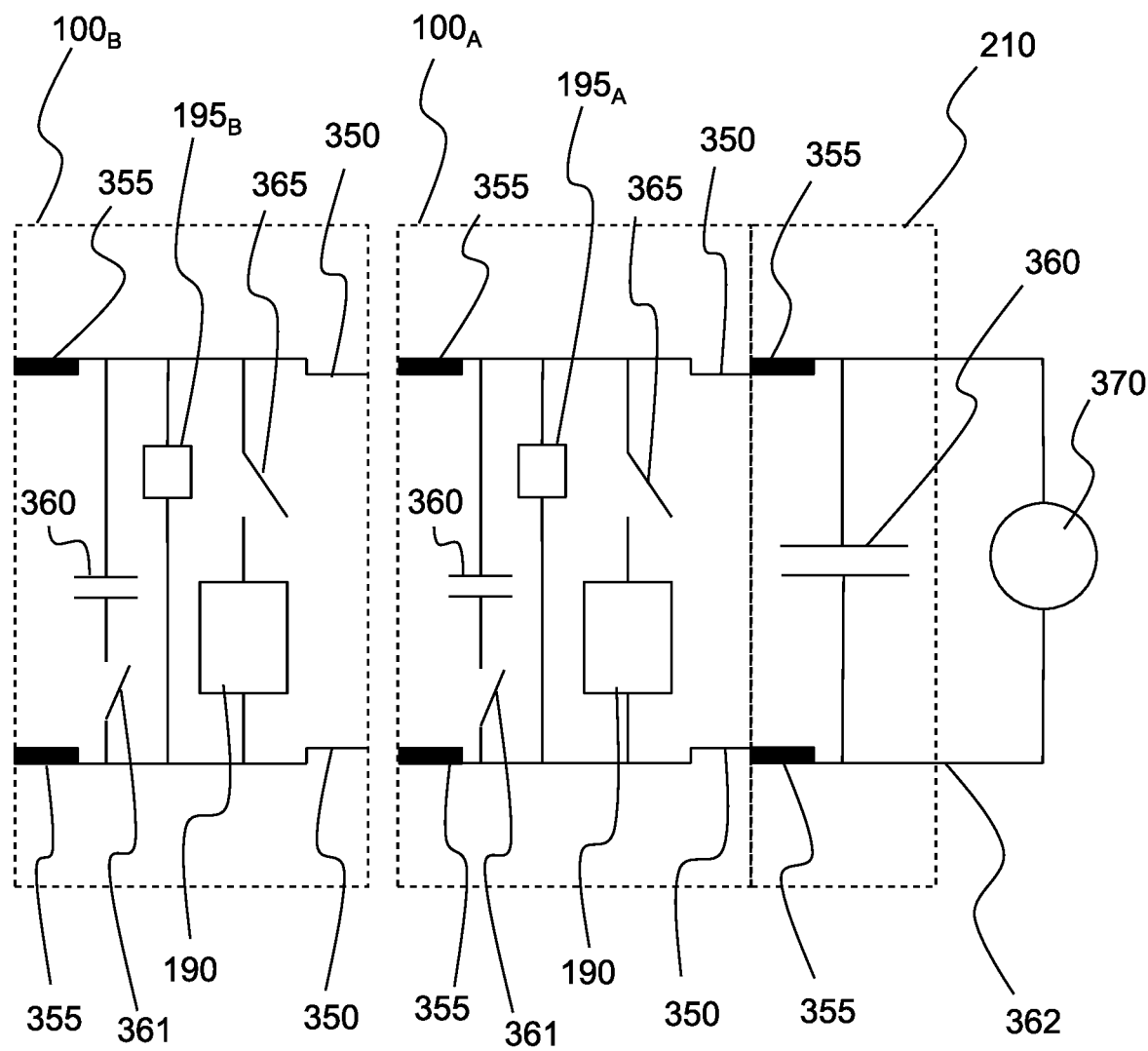
FIG. 3B is a simplified electrical diagram of the vehicle storage of FIG. 2.

FIG. 3B represents a simplified electrical diagram of the bicycles 100$_A$ and 100$_B$ and of the terminal 210. This electrical diagram comprises the charge circuit 362 connecting each battery 190 in parallel.

In order to connect or disconnect each battery 190 from the charge circuit, a switch 365 connects each battery 190 to the charge circuit 362.

The charge circuit 362 is supplied by an electrical power source 370, which is for example an electrical network, an electrical generator or an electrical battery, and which generally delivers a continuous voltage current. The charge circuit 362 is ended by two free plates 355 for a connection with another bicycle 100.

In order to be able to determine whether the electrical connection is well-established during the coupling, the plates 355 of each complementary coupling zone 320 are connected together by way of a condenser 360. It could be highlighted that the charge voltage being generally continuous, the condenser 360 does not short-circuit the charge circuit 362.

When the bicycle $100_B$ is coupled with the bicycle $100_A$, an alternative voltage signal is emitted by the electronic module 195 of the bicycle $100_B$, connected in parallel to the charge circuit 362, and circulates in the charge circuit 362 by being superposed to the continuous charge voltage.

It could be highlighted that the electronic module 195 advantageously comprises electronic protection means (not represented in the figure) avoiding the electronic module 195 from being damaged by the charge current circulating in the circuit 362.

The alternative signal circulating through the condenser of the bicycle $100_B$, the electrical circuit thus being closed even if the batteries 190 are not connected to the charge circuit 362, the electronic module of the bicycle $100_B$ thus has the information that the electrical contact is actually achieved between the two bicycles $100_A$ and $100_B$. The electronic module of the bicycle $100_B$ can thus send a sound or visual signal to the outside of the bicycle $100_B$, which can be seen by an individual.

It could be highlighted that the circulation of the alternative signal does not require that the stock 250 is connected to the terminal 210 or that the terminal 210 is connected to the electrical power source 370. In other words, it is possible to confirm the coupling between two bicycles 100 without any of the bicycles being coupled with the terminal 210 or when the terminal 210 is not supplied with current by a power source.

Furthermore, in order to avoid the electronic module 195 of a bicycle 100 only indicating that the bicycle 100 is coupled with a similar bicycle 100 or with the terminal 210 when the bicycle 100 is free, a switch 361 is associated with the condenser 360 of each bicycle 100. To this end, the switch 361 is open when the bicycle 100 is free. When the bicycle 100 is coupled, for example to the stock 250, the switch 361 of said bicycle 100 is closed as soon as the electronic module 195 detects the coupling by the establishment of the electrical connection with the stock 250.

As soon as the coupling of the bicycle $100_B$ with the bicycle $100_A$ is achieved, an alternative signal sent by the electronic module $195_B$ can circulate in the electrical circuit closed by at least the condenser 360 of the terminal 210 or of the bicycle $100_A$.

When the electrical connection is established successively between each bicycle 100 of the stock 250, the electrical connection can in particular be used to recharge the battery 190 of all or some of the bicycles 100 connected to the terminal 210.

Given that the terminal 210 generally has a limited available electrical power, a clever recharging strategy can be implemented in order to favor the recharging of the battery 190 of one or more bicycles from among the bicycles 100 fastened to the terminal 210.

Figure 4:
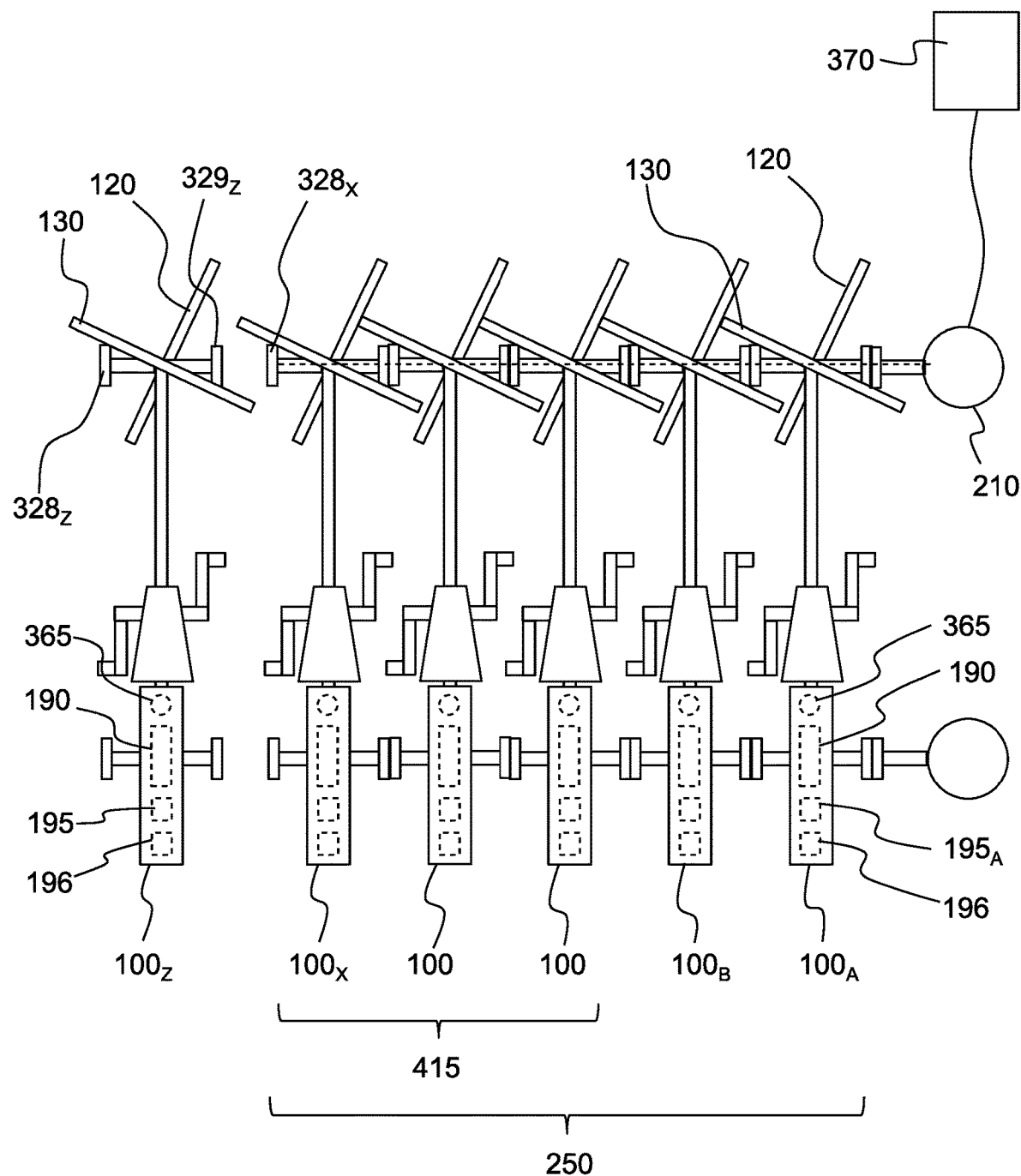
FIG. 4 is a top view of a vehicle stock of FIG. 1.

As illustrated in FIG. 4, a recharging strategy is, for example, to recharge in priority, the bicycle $100_X$ located at the free end of the stock 250, even a plurality of bicycles 100 located in the proximity of a free end of the stock 250, comprised for example, in the lot 415 comprising the three bicycles located at the end of the free end of the stock 250. From among the lot 415, it can be selected preferably to recharge those having the batteries having an energy level lower than the others, or having an energy level less than a predetermined threshold.

In order to manage the recharging strategy, the module 195 of the bicycle $100_A$ fastening to the terminal 210 is used as a "master" and sends a command to the modules 195 of each bicycle 100 of the stock 250, indicating either to connect or to disconnect the battery 190 from the charge line. To this end, an electrical switch 365, capable of being controlled remotely, is inserted in the electrical circuit connecting the battery 190 of each bicycle 100 to the charge circuit.

It could be highlighted that when the bicycle $100_Z$ is coupled with the bicycle $100_X$ located at the free end of the stock 250, the NFC reader $329_Z$ reads the NFC tag 328X of the bicycle $100_X$ comprising the list of identifiers of the stock 250, including the bicycles 100 and the terminal 205, and updates the NFC tag $328_Z$ by adding to the list, the identifier of the bicycle $100_Z$.

The list can also comprise an indication of the status of the battery of each bicycle 100.

The list can then be communicated to the module $195_A$ of the "master" bicycle $100_A$ or to a remote server for managing the fleet of bicycles 100, by way of a wireless telecommunication device, comprising for example, an antenna 3G, installed either on a bicycle 100 or on the terminal 205.

When the module $195_A$ of the bicycle $100_A$ receives the list of bicycles 100 and the statuses of the batteries 190 thereof, the module $195_A$ processes the data in order to determine which are the batteries 190 to be charged in priority in order to optimize the recharging time thereof and to make it possible for a user to have more chance of being able to take a bicycle 100 located at the free end of the stock 250 and to benefit from the electrical pedal-assist, the battery 190 of the bicycle 100 used having been recharged beforehand.

The module $195_A$ sends, by way of the wireless communication device 425, to each bicycle 100, a command indicating the opening or the closing of the switch 365 of each bicycle 100, in order to only connect the batteries 190 selected, in view of recharging them.

The batteries 190 selected, once connected to the charge circuit are then recharged.

Figure 5:
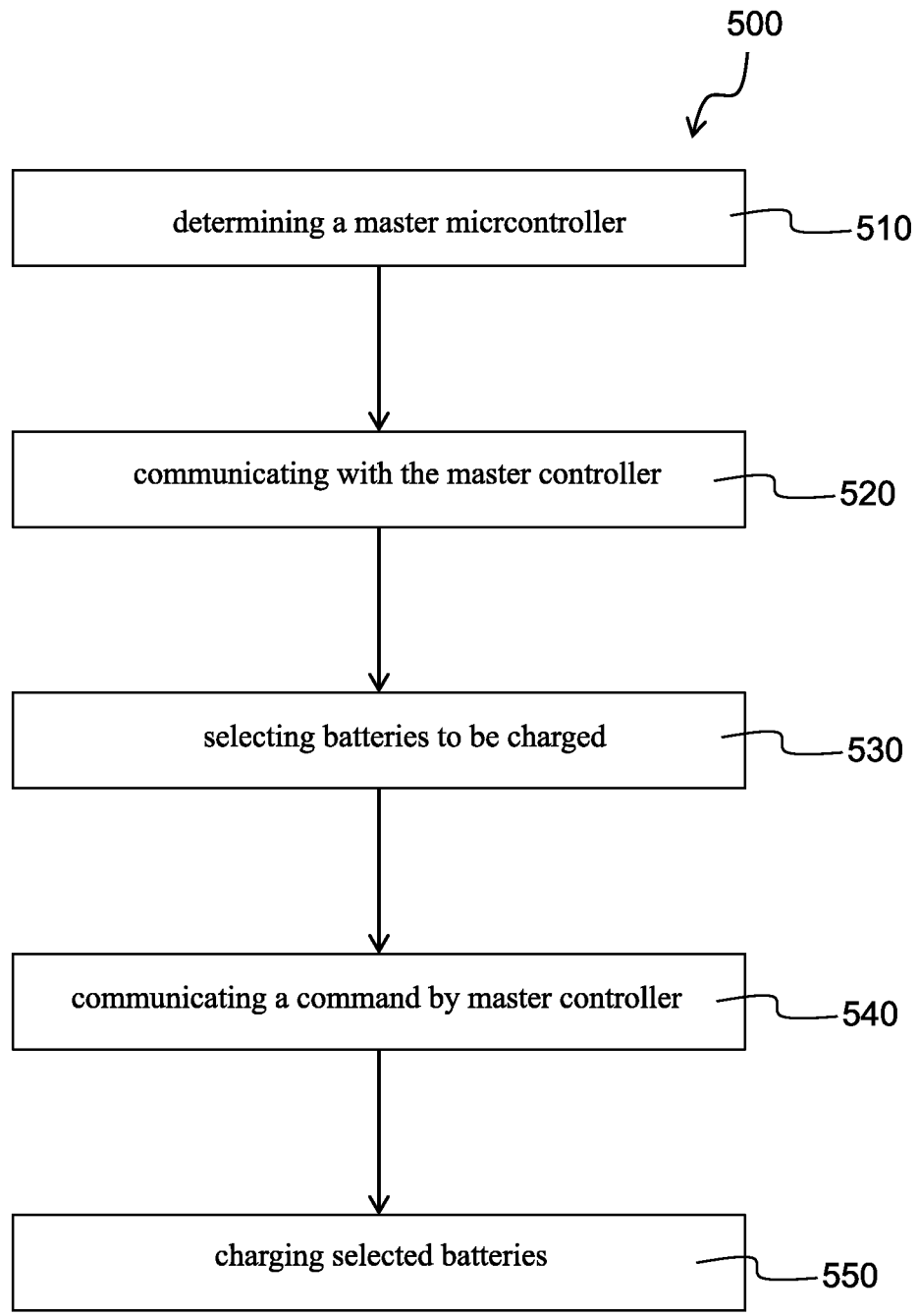
FIG. 5 is a synoptic diagram of a method for recharging all or some of the stock of FIG. 4.

FIG. 5 represents, in the form of a synoptic diagram, the method 500 for recharging a battery 190 of all or some of the bicycles 100 of the stock 250 coupled with the terminal 210.

The method 500 comprises a first step of determining 510 an electronic "master" module, from among the bicycles 100 of the stock 250. The electronic "master" module corresponds, in the present non-limiting example of the invention, to the electronic module 195 of the bicycle $100_A$. The module $195_A$ will thus receive the information relating to the stock 250 in order to control the recharging of all or some of the batteries 190 of the stock 250.

The second step of the method 500 is a step 520 of communicating to the "master" module $195_A$ of the list of the bicycles 100 of the stock 250 and of the status of the battery 190 thereof.

From this list, a selection of at least one battery 190 to be charged is made, during a third step 530 from the charge status of the batteries 190 and of the proximity thereof from the free end of the stock 250.

In the present non-limiting example of the invention, the selection comprises two batteries 190 having a charge level less than a predetermined threshold, from among the batteries of the lot 415.

From the list of the batteries selected, a command is then communicated by the module 195$_A$ of the bicycle 100$_A$ to each bicycle 100 of the stock 250 during a fourth step 540. The command communicated to a given bicycle 100 indicates if the battery 190 of said bicycle has to be connected to the charge circuit 362 or if it has to be disconnected. The command is conveyed consequently respectively by the closing or by the opening of the switch 365 associated with said battery 190.

The batteries 190 selected are then recharged during the fifth step 550.

Other Particular Embodiment Examples of the Invention

Figure 6:
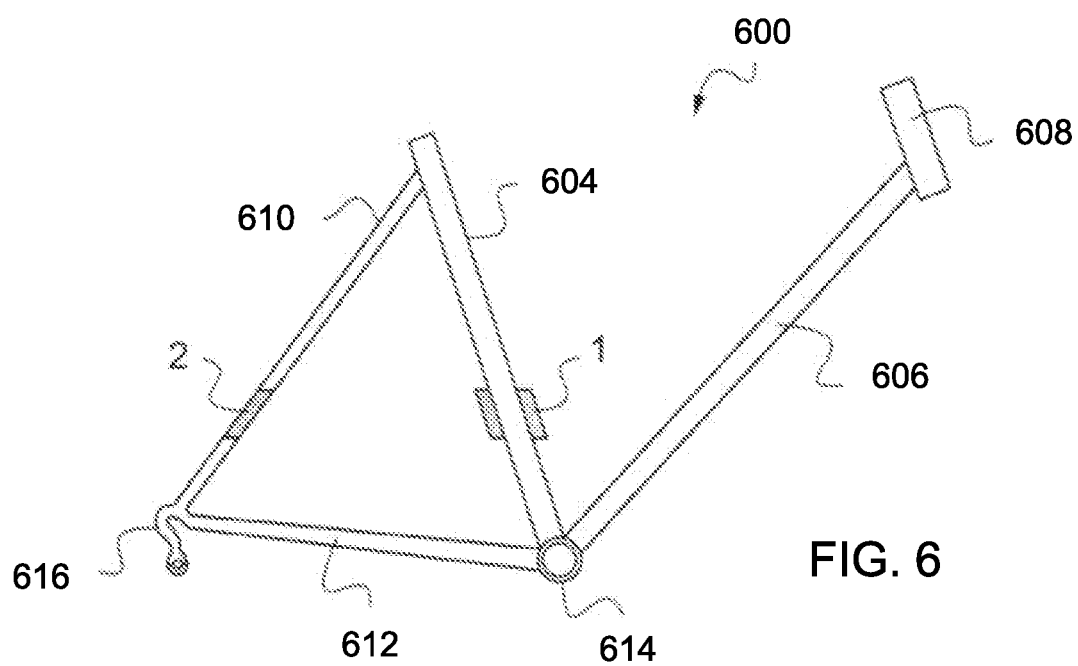
FIG. 6 shows a profile view of a bicycle frame according to the invention.

FIG. 6 shows a structure 600 of a human-powered vehicle according to the invention. The structure 600 which is a bicycle frame 600, has a generally extended form.

The frame 600 is produced by an assembly of tubular elements connected to one another by the ends thereof. This is a frame structure. The frame structure comprises a pair of mutually opposite lateral faces.

A frame 600 can comprise various parts. The present description mainly concentrates on the frame structure composed by the assembly of tubular elements. Thus, the terms "frame" and "frame structure" can generally be considered as equal in the present description.

The frame 600 comprises a saddle tube 604 and a down tube 606 arranged against one another according to a generally V-shape. The down tube 606 carries a junction 608 arranged to receive a steering shaft.

The frame 600 further comprises a pair of seat stays 610, the pair of chain stays 612 and the saddle tube 604 are arranged against one another according to a generally triangular shape.

The frame 600 comprises a pair of rear pads 616 in the junction of the seat stays 610 and of the chain stays 612. The rear pads 616 are arranged to receive a rear wheel of the bicycle.

The frame comprises a bottom bracket shell 614 at the junction of the saddle tubes 604, chain stays 612 and down tube 606. The bottom bracket shell 614 is arranged to receive bicycle pedals.

The frame 600 further comprises a first fastening element 1 and a second fastening element 2.

It could be highlighted that the fastening element 1 corresponds, in the present example, to a fastening means and that the fastening element 2 corresponds to a complementary fastening means, the two forming a coupling kit.

Generally, the first fastening element 1 is mounted in a first zone on the frame structure 600. The first fastening element 1 can protrude from one of the lateral faces.

In the embodiment of FIG. 1, the first fastening element 1 is held to the saddle tube 604 by means of a fixing assembly, for example constituted of a screw and socket set. The fixing assembly holds the first fastening element 1 on a first face of the frame 600.

The second fastening element 2 is complementary to the first fastening element 1. It is arranged in a second zone of the frame structure 600. The second zone is localized on a second face of the frame, i.e. on the face opposite the first face of the frame. The first and second zones are localized on faces opposite one another.

The first zone and the second zone are arranged substantially at one same level of the frame structure 600 and offset from one another along a longitudinal direction of the frame. More specifically, the positions of the first 1 and second 2 fastening elements are substantially at one same height on the frame 600 and offset from one another along the longitudinal direction of the frame.

The first fastening element 1 and the second fastening element 2 are complementary to one another. The first fastening element 1 constitutes a first half of a fastening and the second fastening element 2 constitutes a second half of this fastening. The first fastening element 1 and second fastening element 2 together constitute a complete fastening.

In other words, the first and second fastening elements are configured to be coupled together.

The complementarity of the first 1 and second 2 fastening elements involves a mutual correspondence, for example of form or of nature. It can be an arrangement of male part and female part type, arranged so as to be engaged to form a unit.

Although complementary, the first fastening element 1 and the second fastening element 2 do not necessarily have a similar or comparable form. It is the case, in particular when the first element comprises a magnetized part mounted on the frame and the second element is constituted by a portion of the structure of the frame. The two elements however have forms capable of coming into contact on a surface which is sufficient to ensure the fastening function.

In the embodiment of FIG. 1, the first fastening element 1 comprises a magnet of generally rectangular shape mounted on the saddle tube 604 and the second fastening element 2 is constituted of one portion at least of a seat stay 610 made of a magnetic material. Consequently, the first fastening element 1 and the second fastening element 2 are of the nature to be able to be attached to one another. The difference between two similar bicycles attached to one another is thus optimized.

The use of a magnetized system favors a simple and rapid engagement.

The first fastening element 1 and the second fastening element 2 being held on faces opposite one same frame 600, they can be attached respectively with a second fastening element 2 and a first fastening element 1 of a similar frame, i.e. a separate frame which also comprises the fastening elements and of which the positions of these fastening elements are substantially identical to those of the frame 600.

In the present embodiment, the first fastening element 1 is directly attached on the frame structure 600. More specifically, the first fastening element 1 with a magnet is attached on one of the pair of seat stays 610 made at least partially of a magnetic material.

Optionally, the first fastening element 1 can have a radius so as to mold the seat stay 610. In this manner, the fastening is reinforced.

Thus, a first frame 600 can be attached to a second frame 600 which is similar to the first. The fastening is achieved by means of respective and complementary fastening elements.

More specifically, a first fastening element 1 of a first frame 600 can be attached to a second fastening element 2 of a second frame 600 similar to the first. In the same way, a second fastening element 2 of a first frame 600 can be attached to a first fastening element 1 of a second frame 600 similar to the first.

More generally, frames according to the invention can be attached to one another when they are arranged side-by-side. The first and the second zone are determined at least partially by considering the form and/or the nature of the first fastening element 1 and of the second fastening element 2.

Thus, the form and/or the nature of the first fastening element 1 and of the second fastening element 2 and the respective positionings thereof are selected so as to hold the frames to one another in a relative selected position. When a first fastening element on a frame 600 is engaged with a second fastening element of a similar frame 600, the frames are stabilized against one another in a predetermined position.

Figure 7:
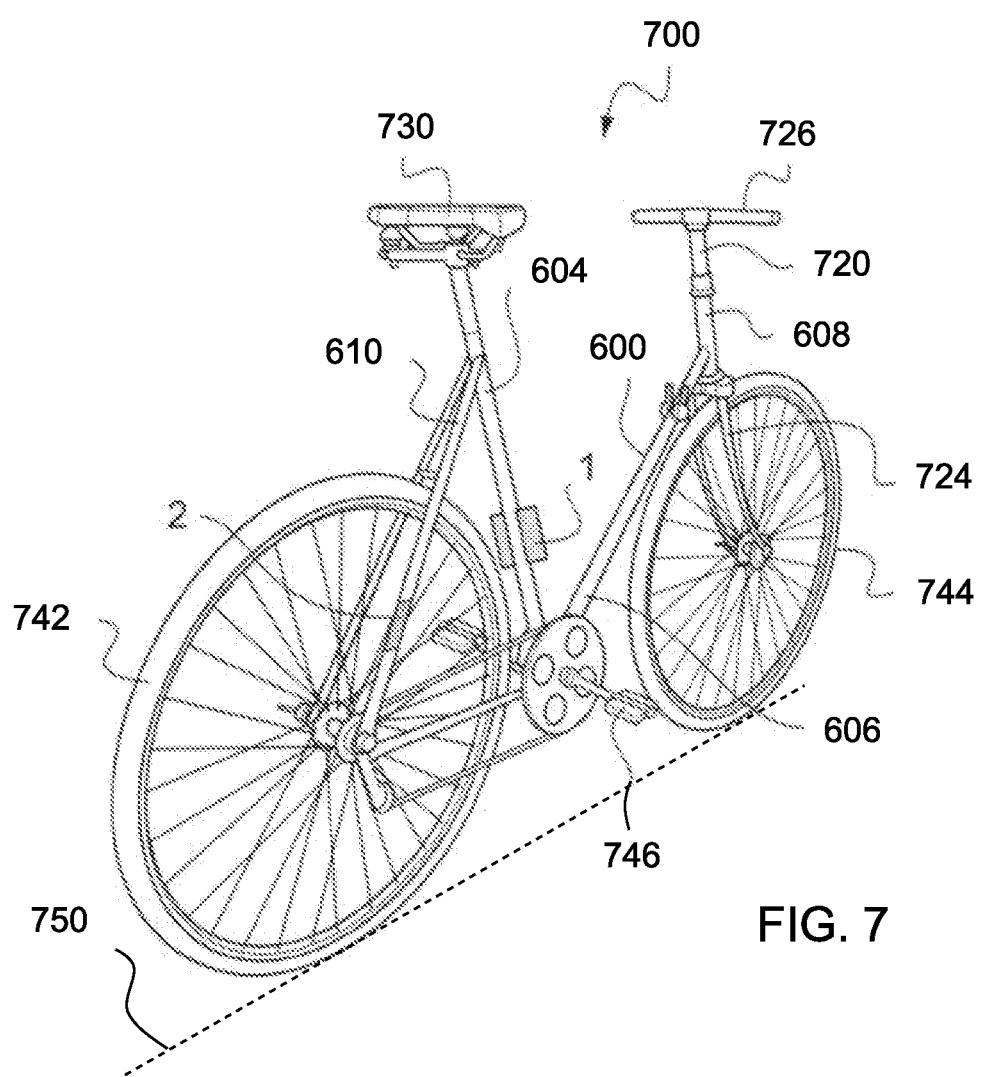
FIG. 7 shows a perspective view of a bicycle comprising the frame of FIG. 6.

FIG. 7 shows a bicycle 700 comprising a frame structure 600 of FIG. 1. The frame 600 comprises a steering shaft 720. The steering shaft 720 comprises a handlebar 726 and a fork 724. The handlebar 726 is straight. The bicycle further comprises a saddle 730, a rear wheel 742, a front wheel 744 and a set of pedals 746. The bicycle 700 is generally moved about a main axis of movement 750, corresponds to the axis of movement when the wheels 742 and 744 are parallel.

The frame 600 described above makes it possible to attach bicycles 700 to one another in a position imposed by the arrangement of the fastening elements on the frame structure. The positioning of the bicycles against one another is stipulated by the respective localizations of the fastening elements. Thus, the first and the second zone are arranged by considering the form of the bicycles. In particular, the zones are selected to minimize and/or optimize the bulk of all of the attached bicycles.

In another embodiment not represented, the first fastening element 1 comprises a rectangular-shaped magnet mounted on the down tube 606 and the second fastening element 2 is partially constituted of at least one fork 610 made of a magnetic material. The first fastening element 1 and the second fastening element 2 are of the nature to be able to be attached to one another. The difference between two similar bicycles attached to one another is thus optimized.

Figure 8:
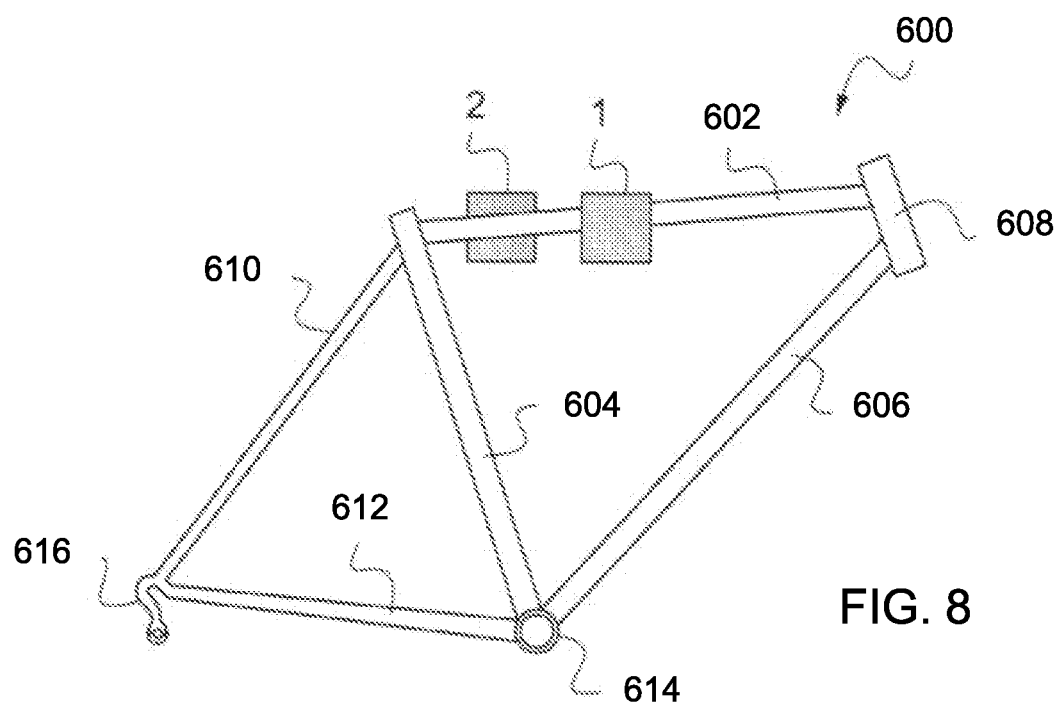
FIG. 8 shows a profile view of a bicycle frame according to an embodiment of the invention.

FIG. 8 shows an embodiment variant of a bicycle frame 600. The frame 600 has a generally extended form.

The frame structure is produced by an assembly of tubular elements connected to one another by the ends thereof.

The frame 600 comprises an top tube 602, a saddle tube 604 and an down tube 606 arranged against one another according to a generally triangular shape. The top tube 602 and the down tube 606 are linked to one another in a junction 608. The junction 608 is arranged to receive a steering shaft.

The frame 600 further comprises a pair of seat stays 610 and a pair of chain stays 612. The pair of seat stays 610, the pair of chain stays 612 and the saddle tube 604 are arranged against one another according to a generally triangular shape. The triangle formed by the pair of seat stays 610, the pair of chain stays 612 and the saddle tube 604, and the triangle formed by the top tube 602, the saddle tube 604 and the down tube, are arranged against one another so as to provide the frame 600 with a general diamond appearance.

The frame 600 comprises a pair of rear pads 616 in the junction of the seat stays 610 and chain stays 612. The rear pads 616 are arranged to receive a rear bicycle wheel.

The frame comprises a bottom bracket shell 614 at the junction of the saddle tubes 604, chain stays 612 and down tube 606. The bottom bracket shell 614 is arranged to receive bicycle pedals.

The frame 600 further comprises a first fastening element 1 and a second fastening element 2 forming a coupling kit.

Generally, the first fastening element 1 and the second fastening element 2 are respectively held to the frame by means of a fixing assembly. More specifically, the first fastening element 1 is held on a first face of the frame 600 and the second fastening element 2 is held on a second face of the frame, opposite the first. The first fastening element 1 and the second fastening element 2 are therefore held on either side of the frame 600.

In the embodiment of FIG. 8, the first fastening element 1 and the second fastening element 2 are held to the upper tube 602 of the frame 600 by means of a fixing assembly, for example constituted of a screw and socket set. The fixing assembly holds the first fastening element 1 on the first face of the frame 600. The fixing assembly furthermore holds the second fastening element 2 on the second face of the frame 600.

The fixing assembly is arranged to as to hold the first fastening element 1 and the second fastening element 2 to the same height of the frame 600. In addition, the fixing assembly is arranged so as to hold the first fastening element 1 and the second fastening element 2 offset against one another on the top tube 602, in a longitudinal direction of this tube.

More generally, the positions of the first 1 and second 2 fastening elements are substantially at one same height on the frame 600 and offset from one another along the longitudinal direction of the frame. In other words, the first 1 and second 2 fastening elements are substantially at the same level of the frame and offset from one another along the longitudinal direction of the frame.

The first fastening element 1 and the second fastening element 2 are complementary to one another. The first fastening element 1 constitutes a first half of a fastening and the second fastening element 2 constitutes a second half of this fastening. The first fastening element 1 and second fastening element 2 together constitute a complete fastening.

The complementarity of the first 1 and second 2 fastening elements involves a mutual correspondence, for example of form or of nature. It can be an arrangement of male part and female part type, arranged so as to be engaged to form a unit.

Here, the first fastening element 1 comprises a rectangular-shaped magnet and the second fastening element 2 comprises a rectangular-shaped plate made of magnetic material. Consequently, the first fastening element 1 and the second fastening element 2 are of the nature to be able to be attached to one another.

The use of a magnetized system favors a simple and rapid engagement.

In a particular embodiment, the first fastening element 1 comprises a first permanent magnet and the second fastening element 2 comprises a second permanent magnet. The force lines of the magnetic fields of the first and second permanent magnets are of the opposite direction. This results in a self-centering effect which favors the correct engagement of the complementary fastening elements. The mutual engagement of the fastening elements is optimized.

EP 2 508 095 discloses a magnetic fastening loop having a self-centering effect. The loop comprises a first plug-in element and a second receiving element. The first plug-in element and the second receiving element are suitable for forming a complete fastening such as described above.

In another embodiment, the first fastening element 1 comprises a hook and the second fastening element 2 comprises a loop. Also, in another embodiment, the first 1 or the second 2 fastening elements comprise a clipping device.

With the first fastening element 1 and the second fastening element 2 being held on opposite faces of one same frame 600, they can be attached respectively with a second fastening element 2 and a first fastening element 1 of a similar frame, i.e. a separate frame which also comprises fastening elements and of which the positions of these fastening elements are substantially identical to those of the frame 600.

A first frame 600 can be attached to a second frame 600 similar to the first. The fastening is achieved by means of the respective and complementary fastening elements.

More specifically, a first fastening element 1 of a first frame 600 can be attached to a second fastening element 2 of a second frame 600 similar to the first. In the same way, a second fastening element 2 of a first frame 600 can be attached to a first fastening element 1 of a second frame 600 similar to the first.

More generally, frames according to the invention can be attached to one another when they are arranged side-by-side.

The first and the second zone are determined partially at least by considering the form and/or the nature of the first fastening element 1 and of the second fastening element 2.

Thus, the form and/or the nature of the first fastening element 1 and of the second fastening element 2 and the respective localizations thereof are selected so as to hold the frames immovably to one another in a relative predetermined position.

When a first fastening element on a frame 600 is engaged with a second fastening element of a similar frame 600, the frames are fixed against one another in a predetermined position.

In a preferable embodiment of the invention, there is one single relative coupling position of a first frame 600 with respect to a second similar frame 600.

The frame described above thus makes it possible to attach bicycles to one another in a predefined position.

The invention makes it possible to store bicycles of a fleet in a fixed and defined configuration. The distribution is stipulated by the respective positions of the fastening elements. With the bicycle frames being directly linked to one another, a considerable increase in space ensues.

By considering the general form of a bicycle, in particular comprising a handlebar, pedals and a saddle, similar bicycles comprising frames of the invention have a general integral appearance, in particular one-piece, when they are attached to one another. The storage of bicycles is optimized in terms of bulk. The need for space with respect to the systems of the state of the art is drastically decreased.

Moreover, bicycles attached together are held in a side-by-side position against one another. In this position, the bicycle wheels are placed on the ground. Consequently, a group of bicycles, for example constituted of two bicycles or more, is capable of standing without support, once attached. It is thus possible to park the bicycles without needing a stand. Bicycles comprising the frame 600 can therefore be parked over the whole generally flat ground.

In a particular embodiment, the fixing assembly comprises a rail and a slide. The slide is arranged on the rail. Each fastening element is fixed to the slide, and the rail is fixed to the bicycle frame 600 so as to offer a degree of freedom in a direction perpendicular to the ground at each fastening element. This makes it possible to overcome possible irregularities of the ground or a sloping ground when the fastening elements are engaged with one another. An amplitude of the slide can in particular be provided, over a distance of a few centimeters, for example 2 to 5 centimeters. This is generally sufficient to overcome slopes or irregularities that can be found on urban ground.

In another embodiment, each fastening element is mounted on the slide by way of a pivot. This increases the degrees of freedom of the fastening elements. In this way, possible greater irregularities of ground can be overcome.

Figure 9:
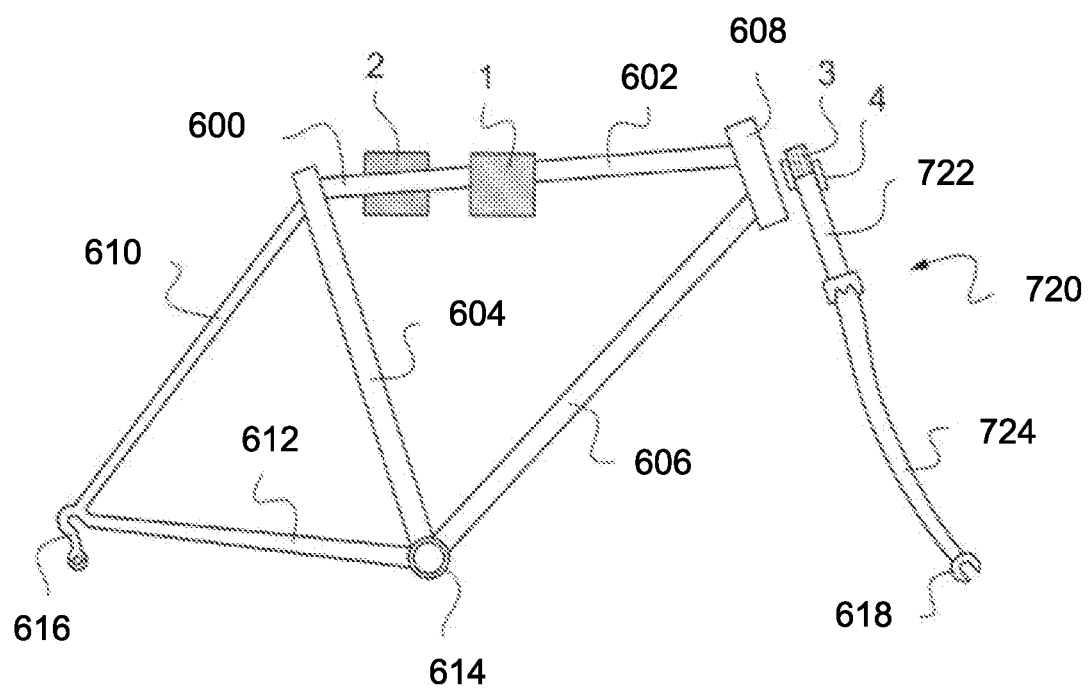
FIG. 9 shows a profile view of the frame of FIG. 8 comprising a steering shaft.

FIG. 9 shows the frame 600 of FIG. 8 and a steering shaft 720. The steering shaft comprises a column tube 722 and a fork 724. The fork 724 has an end comprising a pair of front pads 618 to receive a front bicycle wheel.

The junction 608 of the frame 600 is arranged to receive a column tube 722, and more generally to receive the steering shaft 720. Usually, the junction 608 comprises devices comprising clamping means and ball bearings to, both, hold the shaft 720 and to ensure a degree of freedom in rotation of the shaft 720.

The steering shaft 720 comprises a third fastening element 3 and a fourth fastening element 4 forming a second coupling kit.

It could be highlighted that the third fastening element 3 corresponds, in the present example, to a fastening means and that the fourth fastening element 4 corresponds to a complementary fastening means, both being configured to be coupled together.

The third fastening element 3 and the fourth fastening element 4 are respectively held to the column tube 722. The third fastening element 3 is held on a first face of the column tube 722 and the fourth fastening element 4 is held on a second face of the column tube 722 opposite the first. In the longitudinal direction of the frame 600, the third fastening element 3 is held on the rear face of the steering shaft 720, and the fourth fastening element 4 is held on the front face of the steering shaft 720.

A fixing assembly, for example a screw and socket set, holds the third fastening element 3 on the rear face of the shaft 720. The fixing assembly furthermore holds the fourth fastening element 4 on the front face of the shaft 720.

The fixing assembly is arranged so as to hold the third fastening element 3 and the fourth fastening element 4 at the same height on the shaft 720. In addition, the fixing assembly is arranged so as to hold the third fastening element 3 and the fourth fastening element 4 offset against one another in a perpendicular direction with respect to the length of the shaft 720.

More generally, when the frame 600 is linked to the steering shaft 720, the localizations of the third 3 and fourth 4 fastening elements on the steering shaft 720 are substantially at one same height of the shaft 720 and offset to one another along a transversal direction with respect to the frame 100.

The third fastening element 3 and the fourth fastening element 4 are complementary to one another. The definition and the embodiments described relative to the first 1 and second 2 fastening elements are also applied for the third 3 and fourth 4 fastening elements.

Here, the third fastening element 3 comprises a magnet and the fourth fastening element 4 comprises a plate made of magnetic material. Thus, the third fastening element 3 and the fourth fastening element 4 are of the nature to be able to be attached to one another.

In a particular embodiment, the third 3 and fourth 4 fastening elements respectively comprise a first and a second permanent magnet of which the force lines of the magnetic fields are of the opposite direction. This makes it possible to ensure a self-centering effect of the third 3 and fourth 4 fastening elements, which results in a reliable and simple fastening to be placed down.

In another embodiment, the third fastening element 3 comprises a hook and the fourth fastening element 4 comprises a loop. Also, in another embodiment, the third 3 and fourth 4 fastening elements comprise a clipping device.

With the third fastening element 3 and the fourth fastening element 4 being fixed on opposite faces of the shaft 720, they can be attached respectively with a fourth fastening element 4 and a third fastening element 3 of a similar column, i.e. a separate column which also comprises the fastening elements and of which the localizations of these fastening elements are substantially identical to those of the shaft 720.

More specifically, a third fastening element 3 of a first shaft 720 can be attached to a fourth fastening element 4 of a second shaft 720 similar to the first. In the same way, a fourth fastening element 4 of a first shaft 720 can be attached to a third fastening element 3 of a second shaft 720 similar to the first.

In this way, when the frames 600 of two similar bicycles are attached by means of the first 1 and second 2 fastening elements, the third 4 and fourth 4 fastening elements are engaged with one another to hold the steering shaft in a predefined position. This predefined position is imposed by the respective positions of the third 3 and fourth 4 fastening elements.

The steering shaft 720, which has a degree of freedom in rotation, can be held straight with respect to the frame 600, i.e. so as to align the front and rear wheels on one same bicycle. Two similar bicycles attached to one another are arranged parallel against one another. This further improves the storage of a fleet of bicycles. The bulk is minimized.

Moreover, when two bicycles (or more) are attached, the parallel arrangement thereof offers a good access to attach an additional similar bicycle. There is thus no obstruction linked to the degree of freedom of the shaft 720 and a potential bulk of the handlebar.

The localizations of the first 1 fastening element and/or of the second fastening element 2 on the frame 600 can vary. For example, due to the form of said elements. When two frames 600 are attached, there can therefore be a plurality of relative positions of the first frame 600 with respect to the second similar frame 100. Consequently, there can be a plurality of relative positions of two similar bicycles comprising the frame 600.

Moreover, the localizations of the third 3 fastening element and/or of the second 4 fastening element on the shaft 720 can also vary. For example, due to the form of said elements. When two columns 720 are attached, there can therefore be a plurality of relative positions of the first shaft 720 with respect to the second similar shaft 720. Consequently, there can be a plurality of relative positions of two similar bicycles comprising the shaft 720.

But, when a bicycle comprises the first 1 and second 2 fastening elements and further comprises the third 3 and fourth 4 fastening elements, and that this bicycle is attached to a similar bicycle, i.e. a bicycle also comprising the first 1 and second 2 fastening elements and the third 3 and fourth 4 fastening elements, there is one single relative position of the first frame 600 with respect to the second similar frame 600, on the condition that the corresponding fastening elements are engaged with one another. There is furthermore thus one single relative position of the first shaft 720 with respect to the second similar shaft 720.

Figure 10:
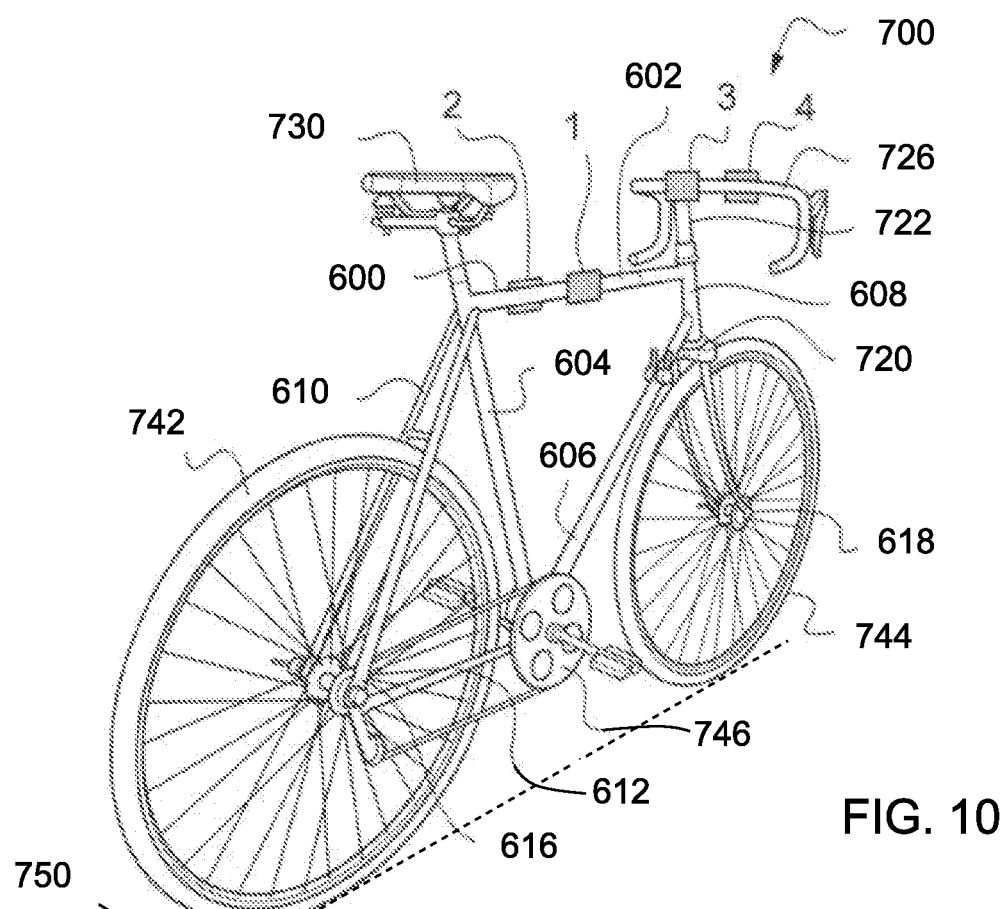
FIG. 10 shows a perspective view of a bicycle comprising a frame according to an embodiment of the invention.
Figure 11:
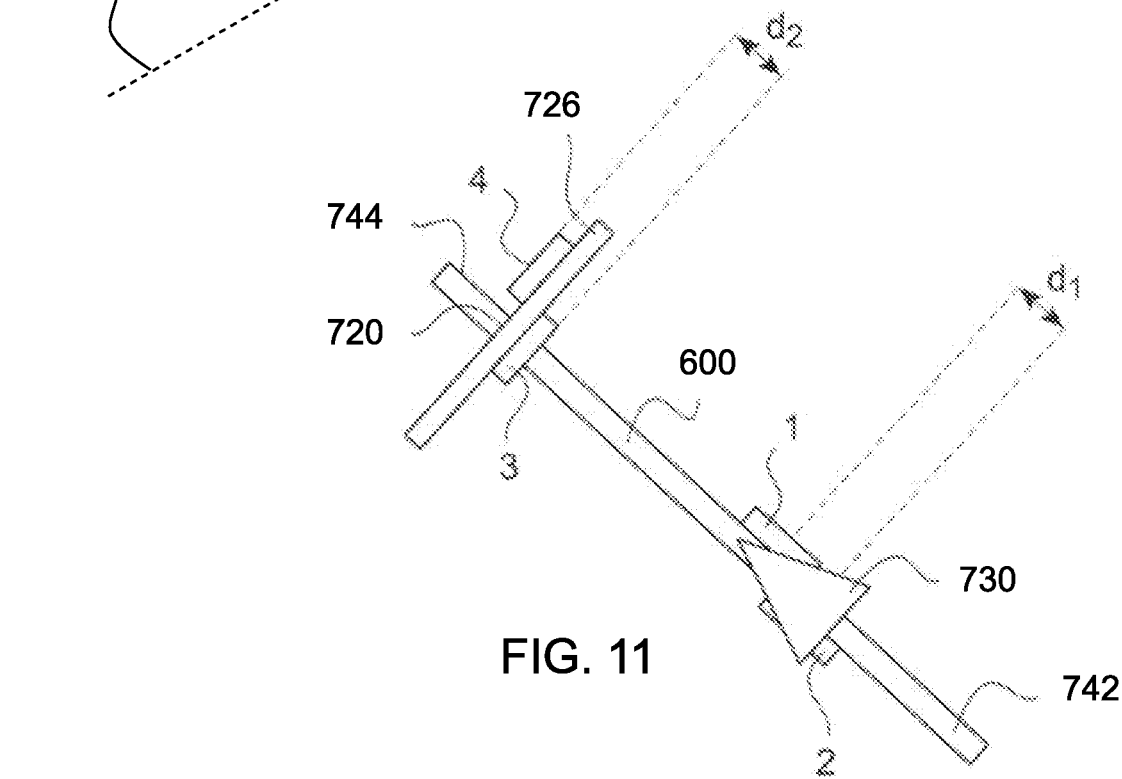
FIG. 11 shows a diagram of a bicycle as a top view comprising a frame according to the invention.

Reference is now made to FIGS. 10 and 11.

FIG. 10 shows a bicycle 700 comprising a frame 600 and a steering shaft 720, and FIG. 11 shows a diagram of the bicycle as a top view of FIG. 10. More generally, FIG. 11 shows a diagram of the construction of a frame and of a steering shaft according to the invention.

Conventionally, the bicycle comprises a saddle 730, a rear wheel 742, a front wheel 744 and a set of pedals 746. The bicycle 700 is generally moved about a main axis of movement 750, corresponds to the axis of movement when the wheels 742 and 744 are parallel.

The steering shaft 720 comprises a handlebar 726. The handlebar 726 comprise a third fastening element 3 and a fourth fastening element 4.

In this embodiment, the third fastening element 3 and the fourth fastening element 4 are therefore not held to the tube of the column 722 (as shown in FIG. 9), but to the handlebar 726.

The third fastening element 3 is held on a first face of the handlebar 726 and the fourth fastening element 4 is held on a second face of the handlebar 726 opposite the first. In the longitudinal direction of the frame 600, the third fastening element 3 is held on the rear face of the handlebar 726, and the fourth fastening element 4 is held on the front face of the handlebar 726.

The third fastening element 3 is held at the center of the rear face of the handlebar 726, i.e. that it is positioned in the general plane of the frame 600.

The fixing assembly is arranged so as to hold the third fastening element 3 and the fourth fastening element 4 at the same height on the handlebar 726.

Furthermore, the fixing assembly is arranged so as to hold the third fastening element 3 and the fourth fastening element 4 offset against one another on the handlebar 726 along a transversal direction with respect to the frame 600.

Figure 12:
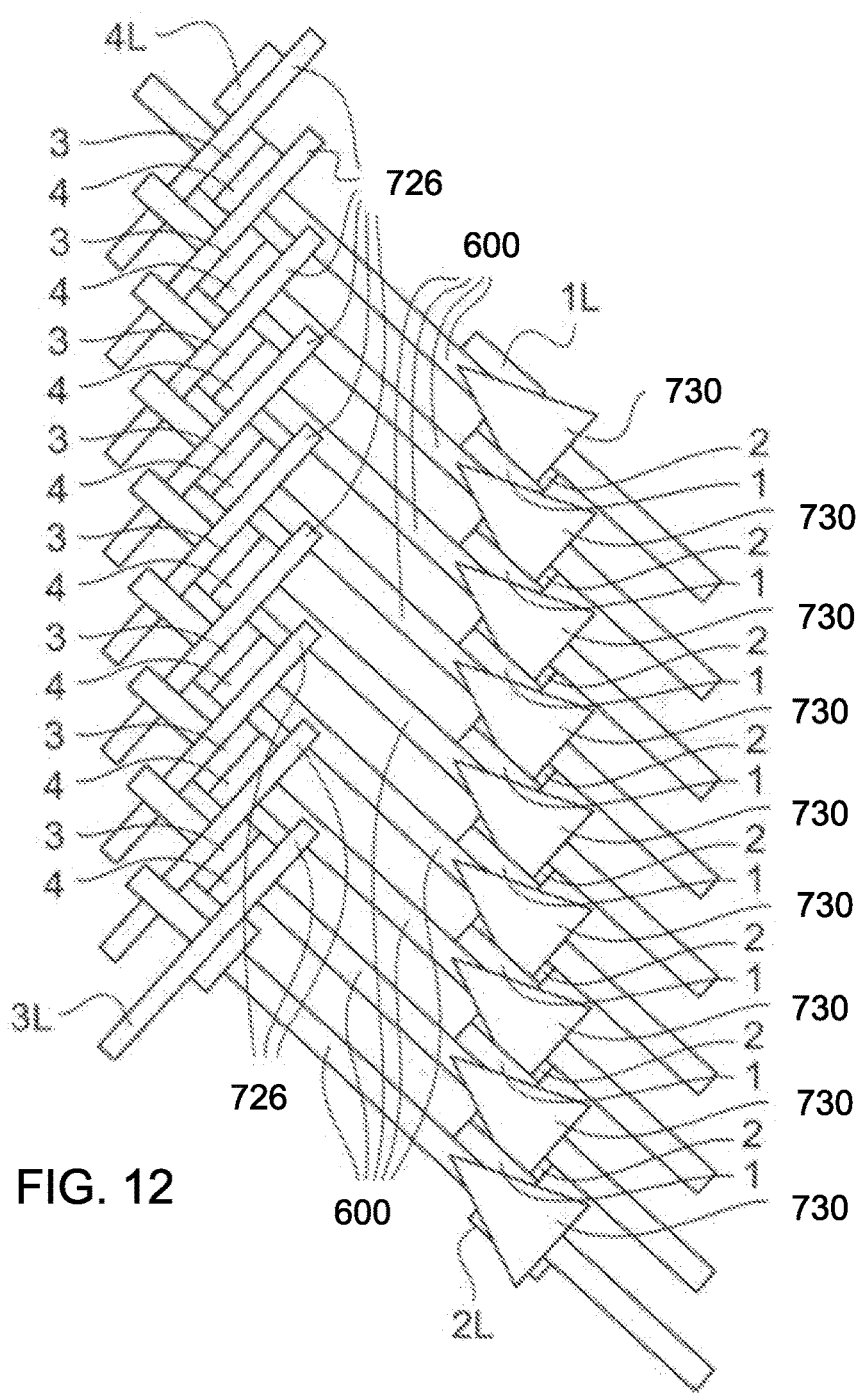
FIG. 12 shows a diagram of a plurality of similar bicycles as a top view, of which each bicycle comprises a frame according to the invention.

FIG. 12 shows a diagram of a portion of a fleet of bicycles as a top view comprising a frame 600 according to the invention.

Each bicycle comprises a frame 600 and a handlebar 726 such as described with respect to FIG. 10.

Each first fastening element 1 of a frame 600 is arranged with a second fastening element 2 of a similar frame 600, and each third fastening element 3 of a handlebar 726 is engaged with a fourth fastening element 4 of a similar handlebar 726.

The two bicycles parked respectively at a first and a second end of all of the bicycles each comprise non-engaged fastening elements. In FIG. 12, these elements are respectively marked 1L to note the first non-engaged fastening element 2L, to note the second non-engaged fastening element, 3L to note the third non-engaged fastening element and 4L to note the fourth non-engaged fastening element.

Figure 13:
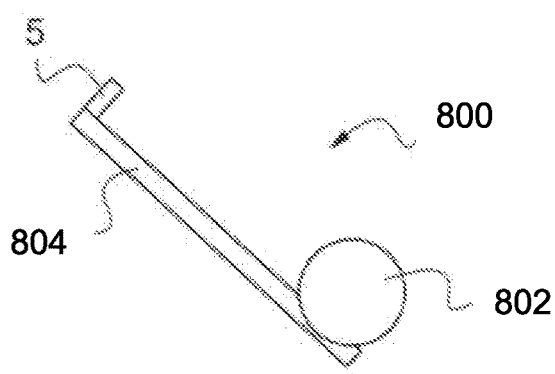
FIG. 13 shows a diagram of a fastening support as a top view.
Figure 14:
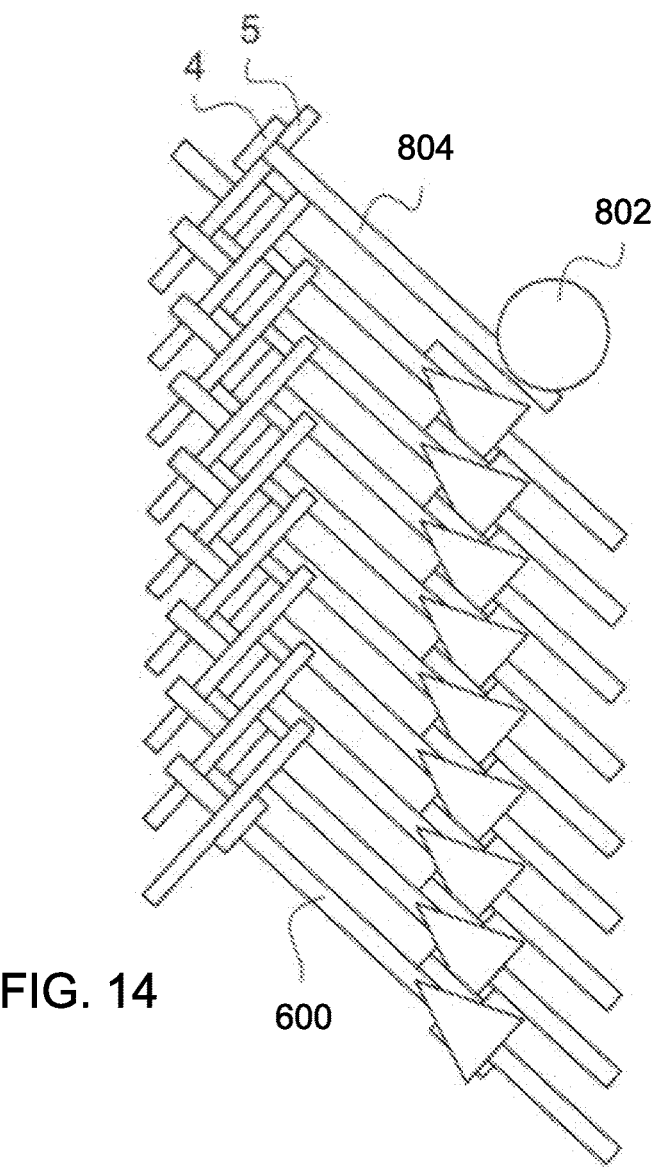
FIG. 14 shows the bicycles of FIG. 12 of which a bicycle is attached to the fastening support of FIG. 13.

Reference is now made to FIGS. 13 and 14. FIG. 13 shows a diagram of a fastening support and FIG. 14 shows the bicycles of FIG. 12 of which one bicycle is attached to the fastening support of FIG. 14.

FIGS. 13 and 14 show a fastening support 800. The support 600 comprises a pillar 802 and a support tube 804.

The pillar 802 is anchored to the ground. It can, for example, be an urban lamppost or an electrical mast. The support tube 804 is fixed perpendicularly to the pillar 802. In this way, the support tube 804 is held in a horizontal position with respect to the ground.

The fastening support 800 further comprises a fifth fastening element 5. The fifth fastening element 5 is complementary to one of the fastening elements selected from among the group constituted of the first fastening element 1, of the second fastening element 2, of the third fastening element 3 and of the fourth fastening element 4.

Here, the fifth fastening element 5 is complementary to the fourth fastening element 4. The fifth fastening element 5 can therefore be engaged with the fourth fastening element 4. Thus, the fifth fastening element 5 is positioned with respect to the ground, substantially at the same height as the fourth fastening element 4. This makes it possible to attach a bicycle 700 to the support 800. This bicycle can thus be used as a fastening point for a similar bicycle and so on. The whole of a fleet of bicycles can therefore be attached directly or indirectly on the support 800.

More generally, a storage accessory (for example, a fastening belt or loop, an urban property such as an electrical mast or a lamppost) comprising a fastening element complementary to one of the fastening elements selected from among the group constituted of the first fastening element 1, of the second fastening element 2, of the third fastening element 3 and of the fourth fastening element 4 can respectively be engaged with this first 1, second 2, third 3 or fourth 4 fastening element. The storage accessory is anchored to the ground. The anchoring to the ground can be achieved, either directly (it is the case of a lamppost, for example) or indirectly (it is the case of a fastening loop fixed on a lamppost, for example).

The third and the fourth localization are determined partially at least by considering the form and/or the nature of the third fastening element 3 and of the fourth fastening element 4.

Thus, the form and/or the nature of the third fastening element 3 and of the fourth fastening element 4 and the respective positionings thereof are selected so as to immovably hold the columns to one another in a determined relative position.

When a third fastening element on the shaft 720 is engaged with a fourth fastening element of a similar shaft 720, the columns are fixed against one another in a determined position.

In a particularly preferably embodiment of the invention, there is one single relative coupling position of a first frame 600 of a first bicycle with respect to a second similar frame 600 of a second bicycle, and one single relative coupling position of a first shaft 720 of the first bicycle with respect to a second similar shaft 720 of the second bicycle.

Bicycles comprising the first 1, second 2, third 3 and fourth 4 fastening elements are fixed in one single relative position against one another.

In an embodiment, at least one from among the first, second, third and fourth fastening elements comprises an electromagnet device. The electromagnet device comprises a command means to lock and unlock the fastening element (s) with the complementary fastening element(s). The electromagnets can comprise coils to generate a magnetic field to lock the complementary fastening elements together, and conversely, to generate a magnetic counter-field facilitating the detachment of the complementary fastening elements.

This type of electromagnet device can, in particular, be used in the embodiments described in reference to FIGS. 6 and 7. In this particular case, the device is, for example, arranged in the first fastening element.

Figure 15:
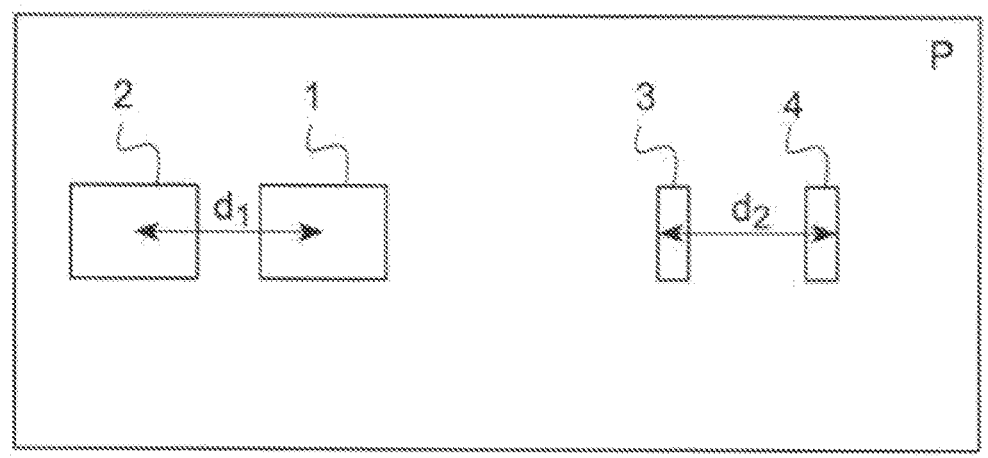
FIG. 15 shows an orthogonal projection of fastening elements in a frame plane.

Reference is now made to FIGS. 11, 12 and 15.

FIG. 11 shows that the distance d1 between the centers of the first 1 and second 2 fastening elements is substantially equal to the distance d2 between the respective outer surfaces of the third 3 and fourth 4 fastening elements.

FIG. 15 shows an orthogonal projection of the first 1, second 2, third 3 and fourth 4 fastening elements in a frame plane.

The frame 600 extends in a plane P. The respective orthogonal projections of the first 1, second 2, third 3 and fourth 4 fastening elements in this plane P show that the distance d1 between the centers of the first 1 and second 2 fastening elements is substantially equal to the distance d2 between the respective outer surfaces of the third 3 and fourth 4 fastening elements.

When it is considered that one of the parked bicycles (FIG. 12), this distance is at the origin of the difference of the frames 600 against one another, and therefore more generally bicycles against one another. The more the distance d1 between the centers of the first 1 and second 2 elements increases, the more the frames 600 are offset against one another.

It could be highlighted that this is a longitudinal difference, about the main axis of movement of the bicycle, which is comprised in the plane P of the bicycle.

This brings, in particular, advantages in the logistics of bicycle maintenance.

Indeed, one of the bicycles according to the invention comprises bicycles stored side-by-side against one another and placed on the ground. The distance and the difference between the bicycles can be adjusted by means of positioning the fastening elements on the frame 600. Consequently, an entire fleet can be organized according to a defined and fixed configuration and/or a defined and fixed geometry. This is particularly useful when it is provided to embark an entire fleet or some of it for maintenance, for example by means of carriages of the forklift type. The stability of the bicycle units is additionally ensured by the fastening elements engaged on one another during transportation.

It could be highlighted that the fastening elements and the complementary fastening elements of the two coupling kits can also comprise complementary electrical connection means in order to electrically connect two coupled frames 600. Such complementary electrical connection means can, for example, correspond to those illustrated in FIG. 3.

Other Optional Advantages and Features of the Invention

From coupling kits each comprising a fastening zone and a complementary fastening zone such as described in at least one of the preceding embodiments, it is possible to achieve a fleet of bicycles being coupled according to another configuration.

It is, for example, possible to achieve a bicycle fleet which is coupled two-by-two, head to tail, i.e. a front fastening zone of a first bicycle being coupled to a complementary fastening zone at the rear of a second bicycle and a complementary fastening zone at the front of the first bicycle being coupled to a fastening zone at the rear of the second bicycle.

In variants of the embodiments described above, at least one fastening zone or a complementary fastening zone can be provided to be mobile, for example, presented at the end of an articulated arm fixed to the vehicle.

The invention claimed is:

1. A structure of a human-powered vehicle, comprising at least one coupling kit comprising a fastening zone and a complementary fastening zone, the fastening zone being configured to be directly coupled to a complementary fastening zone presented by a similar vehicle, wherein the fastening zone and the complementary fastening zone of a same coupling kit are positioned laterally in a plane perpendicular to a main axis of movement of the human-powered vehicle, on opposite sides of the human-powered vehicle.

2. The structure according to claim 1, wherein the fastening zone and the complementary fastening zone of a same coupling kit are positioned laterally, on opposite sides of the human-powered vehicle, and offset by a predetermined distance about a main axis of movement of the human-powered vehicle.

3. The structure according to claim 1, wherein a distance between the fastening zone and the complementary fastening zone of a same coupling kit is less than a size of the human-powered vehicle.

4. The structure according to claim 1, wherein the complementary fastening zone comprises at least one permanent magnet engaging with at least one metal element presented by a fastening zone of the similar vehicle.

5. The structure according to claim 4, wherein said each complementary fastening zone further comprises an electromagnet configured to produce a magnetic field opposite a magnetic field of said at least one permanent magnet.

6. The structure according to claim 1, wherein the fastening zone comprises a male element configured to be coupled with a female element presented by the complementary fastening zone of the similar vehicle.

7. The structure according to claim 6, wherein the female element comprises an oblong-shaped recess, wherein a length of the oblong-shaped recess is oriented perpendicularly to a main axis of movement of the human-powered vehicle.

8. The structure according to claim 1, wherein each of the fastening zone and the complementary fastening zones comprises a complementary electrical connector, the complementary electrical connectors being configured to electrically connect the human-powered vehicle with the similar vehicle.

9. The structure according to claim 1, further comprising a communication device configured to communicate an identification of the human-powered vehicle to the similar vehicle.

10. The structure according to claim 9, wherein each complementary fastening zone comprises a near field communication (NFC) tag; and wherein the fastening zone comprises an NFC reader configured to read an NFC tag of the similar vehicle.

11. The structure according to claim 1 is a frame of a bicycle.

12. A vehicle comprising the structure according to claim 1.

13. The vehicle according to claim 12, comprising a wireless communication device configured to communicate with the similar vehicle, a terminal or a remote server.

14. The vehicle according to claim 12 is a bicycle.

15. A terminal comprising a complementary fastening zone configured to couple to the fastening zone of the vehicle according to claim 12.

16. The terminal according to claim 15, wherein the complementary fastening zone of the terminal comprises an electrical connector configured to electrically supply the vehicle coupled to the terminal; and wherein each of the fastening zone and the complementary fastening zone of the structure comprises a complementary electrical connector, each complementary electrical connector of the vehicle being configured to electrically connect the vehicle with the terminal.

17. A method for recharging batteries of all or some of a plurality of vehicles, each vehicle comprising a structure of a human-powered vehicle, the structure comprising at least one coupling kit comprising a fastening zone and a complementary fastening zone, the fastening zone being configured to be coupled to a complementary fastening zone presented by a similar vehicle or by a terminal, said each vehicle comprising a microcontroller, a pedal-assist device and a battery configured to power the pedal-assist device, the vehicles coupled to one another being called a stock, the stock being coupled to a terminal connected to an electrical supply, the terminal comprising the complementary fastening zone configured to couple to the fastening zone of the vehicles, the method comprising:
  determining a master microcontroller from among the microcontrollers of the coupled vehicles of the stock;
  communicating to a master module, a list of the coupled vehicles of the stock and a status of the battery of each coupled vehicle of the stock;
  selecting at least one battery from the stock to be charged;
  communicating by the master module, a command to the microcontroller of each coupled vehicle of the stock to connect said at least one battery selected to be charged to a charge circuit connected to the electrical supply and disconnect all non-selected batteries of the stock;
  recharging said at least one battery selected to be charged; and
  wherein a number of said at least one battery selected to be charged is restricted to a predetermined number, said at least one battery selected to be charged having a charge level less than a predetermined threshold and from among the batteries of the coupled vehicles connected at a predetermined distance from a free end of the stock, the free end being distal from the terminal.

18. A method for recharging batteries of all or some of a plurality of vehicles, each vehicle comprising a structure of a human-powered vehicle, the structure comprising at least one coupling kit comprising a fastening zone and a complementary fastening zone, the fastening zone being configured to be coupled to a complementary fastening zone presented by a similar vehicle or by a terminal, said each vehicle comprising a microcontroller, a pedal-assist device and a battery configured to power the pedal-assist device, the vehicles coupled to one another being called a stock, the stock being coupled to a terminal connected to an electrical supply, the terminal comprising a microcontroller and the complementary fastening zone configured to couple to the fastening zone of the vehicles, the method comprising:
  communicating to a master module, a list of the coupled vehicles of the stock and a status of the battery of each coupled vehicle of the stock;
  selecting at least one battery from the stock to be charged;
  determining a master microcontroller from among the microcontrollers of the coupled vehicles of the stock or the microcontroller of the terminal;
  communicating by the master module, a command to the microcontroller of each coupled vehicle of the stock to connect said at least one battery selected to be charged to a charge circuit connected to the electrical supply and disconnect all non-selected batteries of the stock; and
  recharging said at least one battery selected to be charged.

* * * * *